United States Patent
Tsujishita et al.

(10) Patent No.: US 6,341,123 B1
(45) Date of Patent: Jan. 22, 2002

(54) DIGITAL AUDIO BROADCASTING RECEIVER

(75) Inventors: Masahiro Tsujishita; Masayuki Ishida; Kenichi Taura; Tadatoshi Ohkubo; Masakazu Morita, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/015,768

(22) Filed: Jan. 29, 1998

(30) Foreign Application Priority Data

Jan. 31, 1997 (JP) .............................. 9-018592

(51) Int. Cl.[7] .............................................. H04L 27/06
(52) U.S. Cl. ........................ 370/210; 375/340; 375/344
(58) Field of Search ................................ 370/203, 210,
370/350, 503, 516; 375/316, 324, 329,
330, 340, 341, 344

(56) References Cited

U.S. PATENT DOCUMENTS

| 5,228,025 A | | 7/1993 | Le Floch et al. ............. 370/20 |
| 5,282,222 A | * | 1/1994 | Fattouche et al. ........... 375/260 |
| 5,550,812 A | * | 8/1996 | Philips ........................ 370/203 |
| 5,787,123 A | * | 7/1998 | Okada et al. ............... 375/324 |
| 5,812,523 A | * | 9/1998 | Isaksson et al. ............ 370/208 |

FOREIGN PATENT DOCUMENTS

| EP | 0656706 A2 | 6/1995 |
| FR | 2721778 | 12/1995 |
| WO | WO9520848 | 8/1995 |

OTHER PUBLICATIONS

"A Digital Audio Broadcasting (DAB) Receiver", K. Taura, et al., IEEE Transactions on Consumer Electronics, U.S. IEEE Inc. vol. No. 3, Aug. 1996, pp. 322–326.

* cited by examiner

Primary Examiner—Chau Nguyen
Assistant Examiner—Jasper Kwoh

(57) ABSTRACT

A digital audio broadcasting receiver comprises a phase error detector for detecting a phase error from data from a differential demodulator, an average value processing unit for determining the average value of phase errors, a memory for storing the phase errors of the carriers outputted from the phase error detector, and a phase error correcting unit which excludes a phase error whose sign is opposite to that of the average value among the phase errors stored in the memory, and determined the average value of phase errors again, thereby making it possible to obtain a phase error signal which is less affected by leakage from other carriers.

7 Claims, 19 Drawing Sheets

$\theta_{ave}$ : AVERAGE VALUE OF PHASE ERRORS
$\theta_{ave}'$ : CORRECTION VALUE FOR THE AVERAGE VALUE OF PHASE ERRORS
$\theta_i$ : PHASE ERROR IN AN i-TH CARRIER Imm : SUM OF MINUS IMAGINARY PARTS
Imp : SUM OF PLUS IMAGINARY PARTS
Rem : SUM OF REAL PARTS WHEN IMAGINARY PARTS ARE MINUS
Rep : SUM OF REAL PARTS WHEN IMAGINARY PARTS ARE PLUS
Imi : IMAGINARY PARTS AFTER PHASE ROTATION
Rei : REAL PARTS AFTER PHASE ROTATION Imm : SUM OF MINUS IMAGINARY PARTS
Imp : SUM OF PLUS IMAGINARY PARTS
Rem : SUM OF REAL PARTS WHEN IMAGINARY PARTS ARE MINUS
Rep : SUM OF REAL PARTS WHEN IMAGINARY PARTS ARE PLUS σ : VARIATION OF PHASE ERROR
θ ave : AVERAGE VALUE OF PHASE ERRORS
θ p : MAXIMUM VALUE OF PHASE ERROR $\theta$ ave : AVERAGE VALUE OF PHASE ERRORS
$\theta$ p : MAXIMUM VALUE OF PHASE ERROR
$\theta$ n : AVERAGE VALUE OF CURRENT PHASE ERRORS
$\theta$ b : AVERAGE VALUE OF PREVIOUS PHASE ERRORS CALCULATED VALUES OF DIFFERENTIALLY DEMODULATED DATA
(FREQUENCY DEVIATION IS -80Hz)

CALCULATED VALUES OF PHASE ERROR WITH RESPECT TO
FREQUENCY WHEN THERE IS LEAKAGE FROM OTHER CARRIERS

DIGITAL AUDIO BROADCASTING RECEIVER

BACKGROUND OF THE INVENTION

The present invention relates to a digital audio broadcasting receiver in which each carrier is subjected to differential phase modulation and orthogonal frequency division multiplexing (OFDM).

As a system which permits transmission of digital data to a mobile object which is strongly affected by the problems of radio wave propagation, such as the multipath and fading, the orthogonal frequency division multiplexing (OFDM) transmission system is known, and the use of this system in broadcasting is under way. Its typical example is seen in digital audio broadcasting (DAB) which is set forth in ITU-R Recommendation BS.774.

FIG. 16 is a block diagram of a digital audio broadcasting receiver.

In the drawing, reference numeral 1 denotes an antenna; 2, an RF amplifier; 3, a frequency converter (MIX); 4, a local oscillator (LO); 5, an intermediate frequency amplifier (IF AMP); 6, an orthogonal demodulator (DEMOD); 7, an A/D converter; 8, a synchronizing signal detector (synchronous detection); 9, a synchronization control means; 10, a complex discrete Fourier transform processing (hereafter referred to as "DFT") means; 11, a differential demodulator; 12, a phase error detector; 13, a frequency tuning control means; 14, a Viterbi decoder; 15, an MPEG audio decoder; 16, a D/A converter; 17, an audio amplifier; and 18, a speaker.

In the receiver configured as described above, the broadcast wave received by the antenna 1 is amplified by the RF amplifier 2, is subjected to frequency conversion by the frequency converter 3, is subjected to removal of unwanted components such as adjacent channel waves and amplification by the intermediate frequency amplifier 5, is subjected to detection by the orthogonal demodulator 6, and is imparted to the A/D converter 7 as a baseband signal.

The signal sampled by the A/D converter 7 is subjected to DFT by the DFT means 10, and the phase of each transmission carrier subjected to quadrature phase shift keying (QPSK) is detected. In the ensuing differential demodulator 11, modulated phases of the same carrier of two transmitted symbols which are timewise adjacent to each other are compared, and processing (differential demodulation) for outputting a phase shift in the mean time is effected. The data subjected to differential demodulation is then outputted to the Viterbi decoder 14 in accordance with a rule on the order of carriers used in modulation on the transmitting side.

In the Viterbi decoder 14, interleaving is canceled during the time spanning over the range of a plurality of symbols transmitted by the transmitting side, the data transmitted through convolutional coding is decoded, and correction of errors of data occurring on the transmission path is effected at that time.

In accordance with the provisions of the layer-2 of ISO/MPEG1, the MPEG audio decoder 15 expands the compressed DAB broadcast audio data outputted from the Viterbi decoder 14, and sends the same to the D/A converter 16. The audio signal subjected to analog conversion by the D/A converter 16 is reproduced by the speaker 18 via the amplifier 17.

Here, the synchronizing signal detector 8 detects the null symbol (the period during which no signal is present) by envelope detection, in the frame alignment signal included in the transmitted signal of DAB. This output serves as a timing signal by which DFT effected by the DFT means 10 through the synchronization control means 9 is executed correctly in synchronism with the transmission frame and each symbol of the signal.

The phase error detector 12 detects an error between an original phase point and the phase data of each carrier outputted from the differential demodulator 11. That is, in DAB, if the frequency of the signal imparted to the orthogonal demodulator 6 is correct, the phase of the differentially demodulated data outputted from the differential demodulator 11 in correspondence with each carrier becomes substantially one of $\pi/4$, $3\cdot\pi/4$, $5\cdot\pi/4$, and $7\cdot\pi/4$.

Accordingly, if the data corresponding to each carrier is multiplied by 4 and the remainder is obtained with respect to $2\pi$, this value becomes $\pi$ if there is no error in the original data, and becomes a multiple of 4 of that value if there is a phase error in the original data, so that phase error detection is carried out. In practice, in the phase error detector 12, the aforementioned operation is performed with respect to the data of the multiplicity of carriers, and the accuracy of detection is improved by averaging the results.

Since the phase error $\epsilon$ thus determined is an output from the differential demodulator 11, the relationship of the following Formula (1) holds between an error $\zeta$ of the signal frequency at this time and the phase error $\epsilon$:

$$\zeta = \epsilon/T \tag{1}$$

Here, T is a symbol period including a guard interval.

The frequency tuning control means 13 operates in such a manner as to cause the frequency error $\zeta$ of the baseband signal imparted from the orthogonal demodulator 6 to approach 0 by controlling the frequency of the intermediate frequency signal outputted from the frequency converter 3 by controlling the frequency of the local oscillator 4 in such a manner that this phase error $\epsilon$ becomes small.

As already described, the DAB signal is comprised of a multiplicity of carriers. To separate the carriers, DFT has an output characteristic shown in FIG. 17, and when the frequency is pulled in correctly, components from other carriers do not leak.

However, when the frequency is not pulled in correctly, components from other carriers leak, as shown in FIG. 18.

Here, if there is no leakage from other carriers even if there is a frequency deviation, adjacent carriers s1 and s2 can be expressed by the following Formula (2):

$$s1 = \exp\{j(2\pi(f0+\Delta f - n\cdot fcc)t\}$$
$$s2 = \exp\{j(2\pi(f0+\Delta f - n\cdot fcc)$$
$$(t+tsym)+\theta c+\theta n)\} \tag{2}$$

where, f0: transmission frequency
$\Delta f$: frequency deviation
n: carrier number
fcc: interval between carrier frequencies
tsym: the period of one symbol
$\theta n$: $(2N+1)p/4$, N is an arbitrary integer
$\theta c$: $2\pi(f0-n\cdot fcc)\cdot tsym$ Accordingly, the phase error from $(2\cdot N+1)\pi/4$ of the same carrier of adjacent symbols can be expressed by the following Formula (3):

$$\theta = \Delta f \cdot tsym \tag{3}$$

Hence, it can be seen that the phase error is proportional to the frequency deviation.

In practice, however, when the frequency has deviated, if there is leakage from other carriers, e.g., a frequency of −80 Hz, large variations appear in the differential modulated data, as shown in FIG. 19. Here, the differentially demodulated data is divided into four quadrants of 0–$\pi/2$, $\pi/2$–$\pi$, $\pi$–$3\pi/2$, and $3\pi/2$–$2\pi$, but there occurs data which enters adjacent quadrants as shown in FIG. 19, and the sign of the data which shifted to adjacent quadrants becomes opposite and such data constitutes a large phase error. Since erroneous data in which the sign of phase error is opposite is also used in averaging processing by the phase error detector, the detected phase error assumes a value smaller than a real value.

In addition, the greater the deviation of the frequency, the greater the leakage of components from other carriers, so that the variation becomes larger, and the data is located closer to the adjacent quadrants, with the result that the aforementioned error is liable to occur. For this reason, as for the frequency deviation and the average value of phase errors, the phase error becomes small starting from the frequency deviation of 70 Hz or thereabouts, where the frequency deviation and the average phase error cease to be proportional. For this reason, if the frequency deviation is large, there has been a problem in that it takes time in the pulling in of the frequency.

SUMMARY OF THE INVENTION

The present invention has been devised to overcome the above-described problem, and its object is to obtain a digital audio broadcasting receiver which is provided with a frequency control means for a local oscillator which is not affected by variations in the phase error due to the frequency deviation.

In the digital audio broadcasting receiver in accordance with the present invention, a DAB signal inputted from the antenna is subjected to OFDM demodulation by the DFT, the phase difference between two successive symbols on the same carrier is calculated by the differential demodulator, the deviation of the differentially demodulated data in an N-th quadrant from a $(2N-1)\pi/4$ radian is detected as the phase difference by the phase error detector, the phase errors of the carriers are averaged by the average value processing unit, the sign of the phase errors is detected by the sign determining unit, the phase error is corrected by excluding the effect of data which changed to an adjacent carrier by the phase error correcting unit in correspondence with the result of determination by the sign determining unit, and the frequency of the local oscillator is controlled by the corrected phase error.

In the digital audio broadcasting receiver in accordance with the present invention, a DAB signal inputted from the antenna is subjected to OFDM demodulation by the DFT, the phase difference between two successive symbols on the same carrier is calculated by the differential demodulator, the deviation of the differentially demodulated data in an N-th quadrant from a $(2N-1)\pi/4$ radian is detected as the phase difference by the phase error detector, the phase errors of the carriers are averaged by the average value processing unit, the sign of the phase errors is detected by the sign determining unit, and the frequency of the local oscillator is controlled by restoring the data which changed to an adjacent carrier by the phase error correcting unit in correspondence with the result of determination by the sign determining unit.

In addition, a DAB signal inputted from the antenna is subjected to OFDM demodulation by the DFT, the phase lo difference between two successive symbols on the same carrier is calculated by the differential demodulator, a phase rotation by a $(2N-1)\pi/4$ radian is imparted to the differentially demodulated data in an N-th quadrant by the phase rotating unit, the sign of imaginary parts of the data after the phase rotation is determined by the imaginary-part sign determining unit, addition is effected with respect to only the data whose signs of the imaginary parts are the same, the phase error detecting unit detects the phase error by excluding the effect of data which changed to an adjacent carrier, and the frequency of the local oscillator is controlled.

In addition, a DAB signal inputted from the antenna is subjected to OFDM demodulation by the DFT, the phase difference between two successive symbols on the same carrier is calculated by the differential demodulator, a phase rotation by a $(2N-1)\pi/4$ radian is imparted to the differentially demodulated data in an N-th quadrant by the phase rotating unit, the sign of imaginary parts of the data after the phase rotation is determined by the imaginary-part sign determining unit, addition is effected with respect to only the data whose signs of the imaginary parts are the same, the effect of data which changed to an adjacent carrier is restored by the phase error detecting unit, and the frequency of the local oscillator is controlled.

In addition, a DAB signal inputted from the antenna is subjected to OFDM demodulation by the DFT, the phase difference between two successive symbols on the same carrier is calculated by the differential demodulator, the deviation of the differentially demodulated data in an N-th quadrant from a $(2N-1)\pi/4$ radian is detected as the phase difference by the phase error detector, the phase errors of the carriers are averaged by the average value processing unit, the relative magnitude of leakage from another carrier is determined on the basis of output data from the differential demodulator, the average value of phase errors is corrected by the phase error correcting unit if the leakage from another carrier is large, and the frequency of the local oscillator is controlled.

In addition, a DAB signal inputted from the antenna is subjected to OFDM demodulation by the DFT, the phase difference between two successive symbols on the same carrier is calculated by the differential demodulator, the deviation of the differentially demodulated data in an N-th quadrant from a $(2N-1)\pi/4$ radian is detected as the phase difference by the phase error detector, the phase errors of the carriers are averaged by the average value processing unit, the variation of the differentially demodulated data is detected by the variation determining unit, the average value of phase errors is corrected if the variation is large, and the frequency of the local oscillator is controlled.

In addition, a DAB signal inputted from the antenna is subjected to OFDM demodulation by the DFT, the phase difference between two successive symbols on the same carrier is calculated by the differential demodulator, the deviation of the differentially demodulated data in an N-th quadrant from a $(2N-1)\pi/4$ radian is detected as the phase difference by the phase error detector, the phase errors of the carriers are averaged by the average value processing unit, an inclination of the magnitude of the phase error is detected by the inclination detecting unit, the average value of phase errors is corrected if the inclination is not in a converging direction, and the frequency of the local oscillator is controlled by the corrected phase error.

In the digital audio broadcasting receiver in accordance with the present invention, the phase error correcting unit handles the phase error whose sign is different from the sign of the average value of phase errors as being data in an adjacent quadrant since the phase difference in the differentially demodulated data has exceeded ±π/2, and determines that the data is erroneous. Hence, the phase error correcting unit corrects the phase error by effecting averaging with respect to only the phase errors whose sign agrees with the sign of the average value of phase errors.

In addition, in the digital audio broadcasting receiver in accordance with the present invention, in the restoration of the phase error by the phase error correcting unit, if the sign of the phase error is different from the that of the average value, the phase error is considered as being data in an adjacent quadrant since the phase difference in the differentially demodulated data has exceeded ±π/2. If the phase error is assumed to be q, the phase error correcting unit effects correction of θ−π/2 if the phase error is plus, and θ+π/2 if the phase error is minus.

In addition, in the digital audio broadcasting receiver in accordance with the present invention, if the absolute value is smaller between the absolute value of the sum of plus imaginary parts and the absolute value of the sum of minus imaginary parts, the phase error is ±π/2 or more, so that such data is handled as being data in an adjacent quadrant. Hence, since it is considered that the sign has been erroneous, the phase error correcting unit calculates imaginary parts/real parts of only the data whose absolute value is greater, and outputs the same as the phase error.

In addition, in the digital audio broadcasting receiver in accordance with the present invention, the phase error correcting unit calculates imaginary parts/real parts for plus imaginary parts and imaginary parts/real parts for minus imaginary parts, and the data which exhibits a greater absolute value between plus imaginary parts and minus imaginary parts is left as it is and is set as a phase error 1. Meanwhile, in the case of data which exhibits a smaller absolute value is handled as data in an adjacent quadrant since the phase error has exceeded ±π/2, and it is considered that the sign of such data has been erroneous. Accordingly, if the phase error is assumed to be q, the phase error correcting unit effects correction of ±−π/2 if the imaginary parts are plus, and θ+π/2 if the imaginary parts are minus, thereby restoring the phase error to an original phase error as a phase error 2. An average of the phase error 1 and the phase error 2 is used as the phase error.

In addition, in the digital audio broadcasting receiver in accordance with the present invention, if the leakage from another carrier becomes large, the phase error becomes smaller than a real value due to the leakage from another carrier, so that the phase error correcting unit provides processing for increasing the phase error, for example.

In addition, in the digital audio broadcasting receiver in accordance with the present invention, the greater the frequency deviation, the more the leakage from another carrier increases in the result of DFT, and the phase is also affected. The effect becomes large when the phase difference with respect to a neighboring carrier is ±π/2, but the phase difference with a neighboring carrier is not uniform. For this reason, the leakage from other carriers also changes. Therefore, variations occur in the result of differential modulation as shown in FIG. 19. The greater the leakage from other carriers, the larger the variations, so that the variation of the data is calculated by the phase error correcting unit to determine the relative magnitude of leakage from other carriers.

In addition, in the digital audio broadcasting receiver in accordance with the present invention, the leakage component makes use of the fact that, between the region where the leakage from another carrier is large and the region where it is small, the signs of inclination of phase errors with respect to the frequency deviation are opposite. First, since feedback is provided to the local oscillator in such a manner that the phase difference approaches 0, the magnitude of the phase difference becomes small in the region where the leakage from other carriers is small. However, in the region where the frequency leakage is large, even if the phase error is small, the effect of leakage components from other carriers becomes small and the phase error approaches a real phase error, so that the phase error becomes apparently large. Accordingly, the leakage from other carriers is detected by performing a calculation in accordance with the following formula:

Δθ= (absolute value of the average value of current phase errors)−(absolute value of the average value of previous phase errors) If the sign of the previous errors and the sign of the current phase errors are the same, it is considered that the real phase error is approaching 0. As a result, if Δθ is plus, it can be determined that the phase error is becoming smaller than the real value due to the leakage from other carriers.

DETAILED DESCRIPTION OF THE PREFERRED EMBODIMENTS

Figure 1:
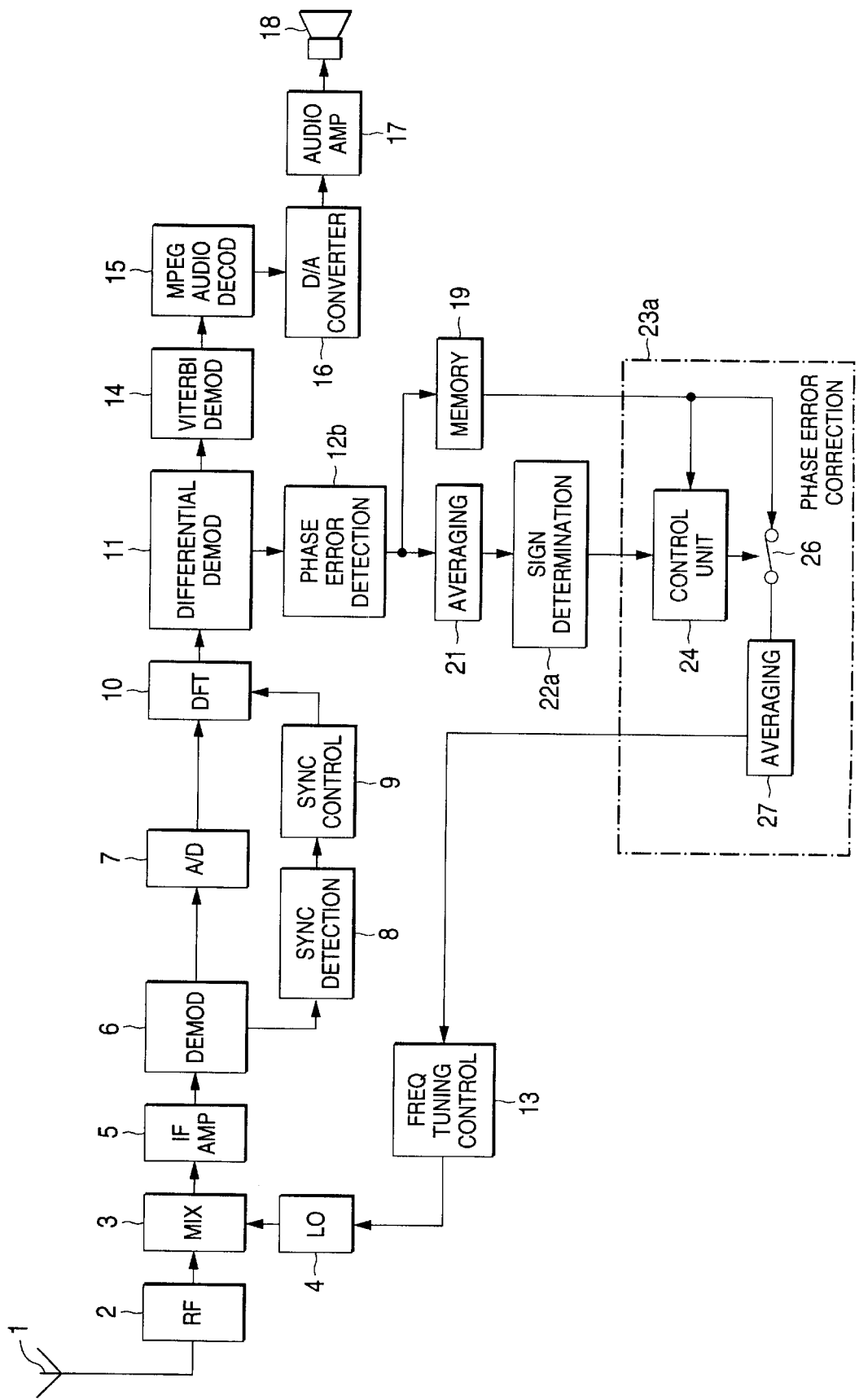
FIG. 1 is a block diagram illustrating the configuration of a digital audio broadcasting receiver in accordance with a first embodiment of the present invention.

Hereafter, a specific description will be given of the embodiments of the present invention by referring to the drawings which illustrate its embodiments.

First Embodiment

FIG. 1 is a schematic block diagram illustrating a first embodiment of the present invention. In the drawing, reference numeral 1 denotes an antenna; 2, an RF amplifier; 3, a frequency converter (MIX); 4, a local oscillator (LO), 5, an intermediate frequency amplifier (IF AMP); 6, an orthogonal demodulator (DEMOD); 7, an A/D converter; 8, a synchronizing signal detector (synchronous detection); 9, a synchronization control means; 10, a DFT means; 11, a differential demodulator; 12b, a phase error detector for detecting a phase error from $(2N-1)\pi/4$ of each carrier outputted from the differential demodulator 11; 13, a frequency tuning control means; 14, a Viterbi decoder; 15, an MPEG audio decoder; 16, a D/A converter; 17, an audio amplifier; 18, a speaker; 19, a memory for storing an output of the phase error detector 12b; 21, an average value processing unit for calculating the average value of outputs of the phase error detector 21; 22a, a sign determining unit for determining the sign of an output from the average value processing unit 12b; and 23a, a phase error correcting section for correcting the phase error by determining an error in the phase error from the result from the sign determining unit and by eliminating the error if the phase error is erroneous.

The data received by the antenna 1 is passed through the RF amplifier 2, the frequency converter 3, the intermediate frequency amplifier 5, the orthogonal demodulator 6, and the A/D converter 7, and is subjected to complex discrete Fourier transform processing by the DFT means 10. The signal demodulated by the DFT means 10 is subjected to differential demodulation by the differential demodulator 11. Here, if the oscillation frequency of the local oscillator 4 has deviated, a phase rotation of a predetermined level or more occurs during the period of one symbol.

For this reason, the phase of the differentially demodulated data between the adjacent symbols deviates from $(2N-1)\pi/4$. The phase error detector 12b calculates the phase error $\theta i$ of each carrier, and the memory 19 stores $\theta i$.

In addition, the averaging processing of phase errors detected by the phase error detector 12b is effected by the average value processing unit 21. Since the data which shifted to adjacent quadrants is also included in this processing, the calculated value is smaller than a real phase error. However, it is considered from FIG. 20 that its sign does not change.

In the phase error correcting section 23a, when the average value and the sign determined by the sign determining unit 22a are of the same data among the phase error data from the memory 19, a control unit 24 turns on a switch 26, and the average value of phase errors inputted from the memory 19 is calculated by an average value processing unit 27.

Figure 2:
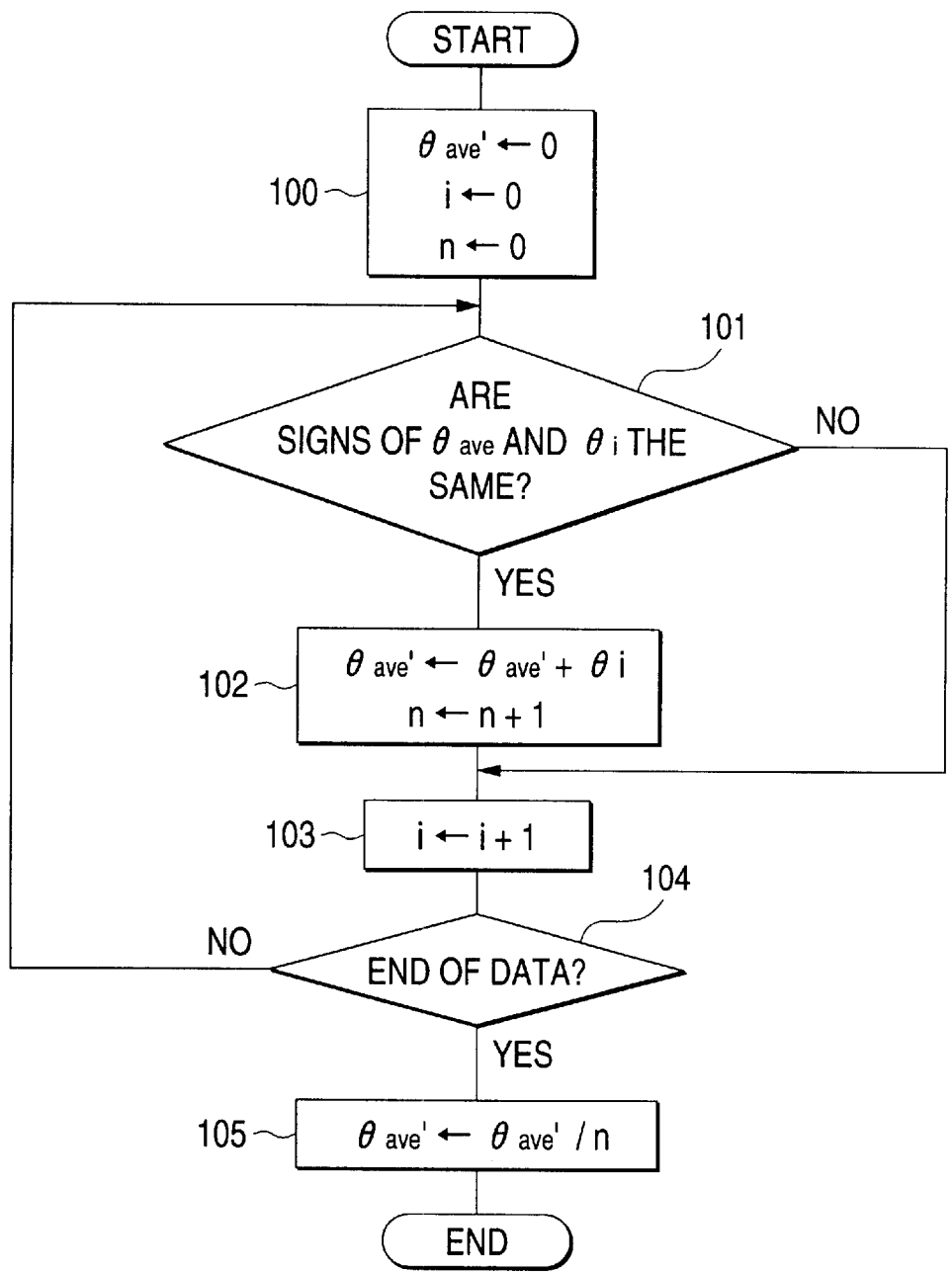
FIG. 2 is a flowchart of processing by a phase error correcting section in accordance with the first embodiment.

FIG. 2 is a flowchart of processing by the phase error correcting section 23a. Initialization is effected in Step 100, and a determination is made in Step 101 as to whether or not the sign of the average value of phase errors and the sign of an i-th phase error are the same. If they are the same, in Step 102 the phase error $\theta i$ are is added and the number n of the added carrier is incremented by 1. If they are not the same, i is incremented by 1 in Step 103, and if i is greater than a value corresponding to the final data in Step 104, a determination is made that it is the end of data, and the average value is calculated in Step 105.

Through this processing, it is possible to detect a phase error without being affected by data which changed to adjacent quadrants.

Figure 3:
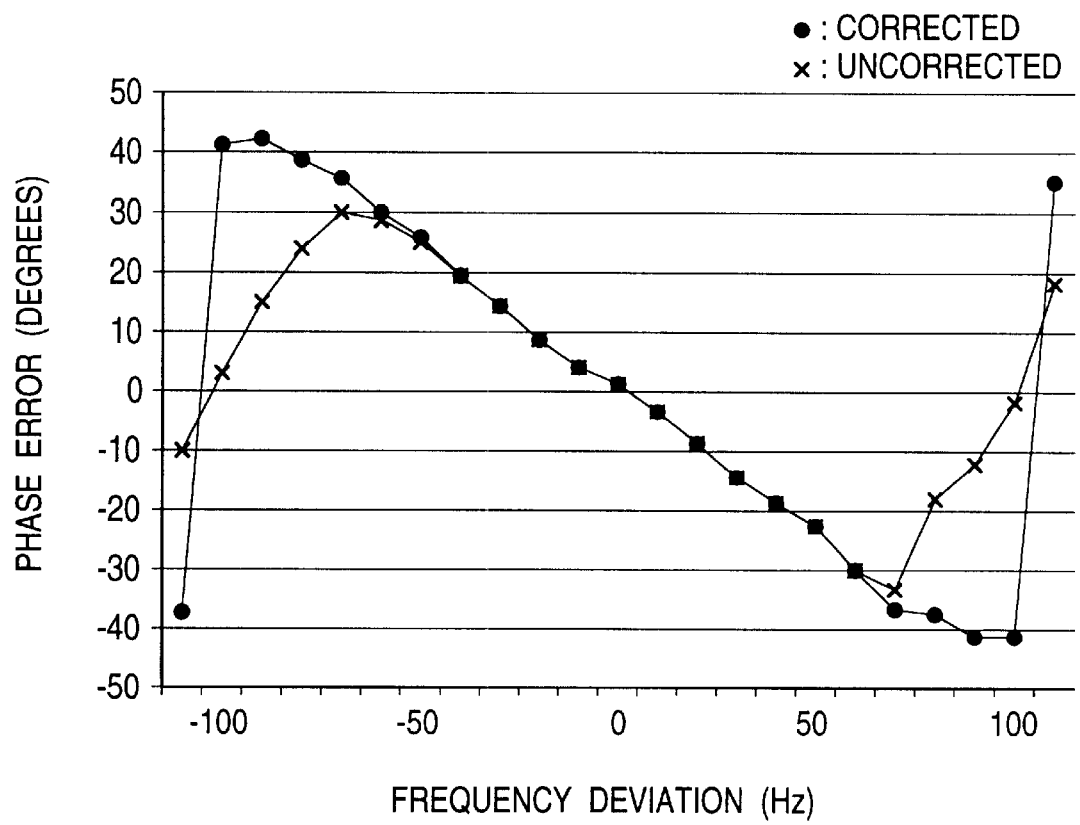
FIG. 3 is a diagram illustrating the results of measurement of the phase error with respect to the frequency deviation in accordance with the first embodiment.

FIG. 3 is a diagram illustrating the results of measurement of the phase difference due to the frequency deviation of differential decoded data in accordance with a conventional example and the first embodiment. In the first embodiment, it is possible to detect a phase error which is substantially proportional to the frequency deviation even up to a large frequency deviation, and the frequency tuning control means 13 changes the frequency of the local oscillator 4 by a frequency portion proportional to this phase error.

Second Embodiment

Figure 4:
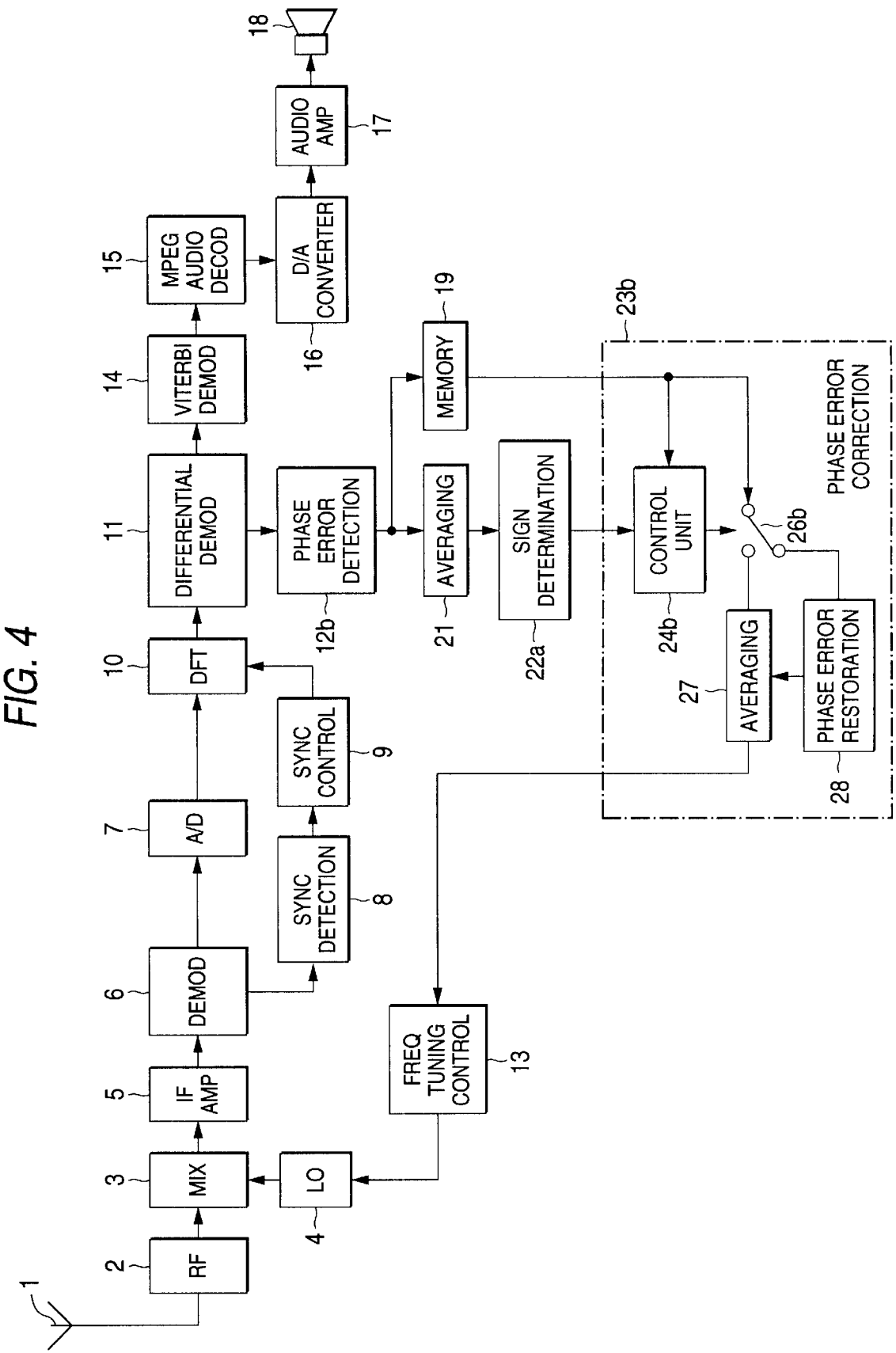
FIG. 4 is a block diagram illustrating the configuration of the digital audio broadcasting receiver in accordance with a second embodiment of the present invention.

FIG. 4 is a schematic block diagram illustrating a second embodiment of the present invention, and the same reference numerals as those of FIG. 1 denote identical or corresponding portions, respectively. In the drawing, reference numeral 23b denotes a phase error correcting section which detects an error in the phase error in correspondence with the result of the sign determining unit and restores the phase error if in error. The phase error correcting section 23b is comprised of a control unit 24b, a switch 26b, the average value processing unit 27, and a phase error restoring unit 28.

Since the operation of the antenna 1 to the sign determining unit 22a is identical to that of the first embodiment, a description thereof will be omitted. Although the phase error data different in the sign from the output from the sign determining unit 22a is not used in the phase error correcting section 23a in the first embodiment, the second embodiment differs from the first embodiment in that the phase error data different in the sign is used. Namely, if the sign of the phase error data from the memory 19 is the same as the sign of the average value determined by the sign determining unit 22a, the control unit 24b connects the switch 26b to the average value processing unit 27, and connects the same to the phase error restoring unit 28 if the sign is different. The phase error restoring unit 28 effects the processing of $\theta i \leftarrow \theta i - \pi/2$ if the phase data $\theta i \geq 0$, and $\theta i \leftarrow \theta i + \pi/2$ if the phase data $\theta i < 0$, and outputs the result to the average value processing unit 27. The average value processing unit 27 calculates the average value of the inputted phase errors.

Figure 5:
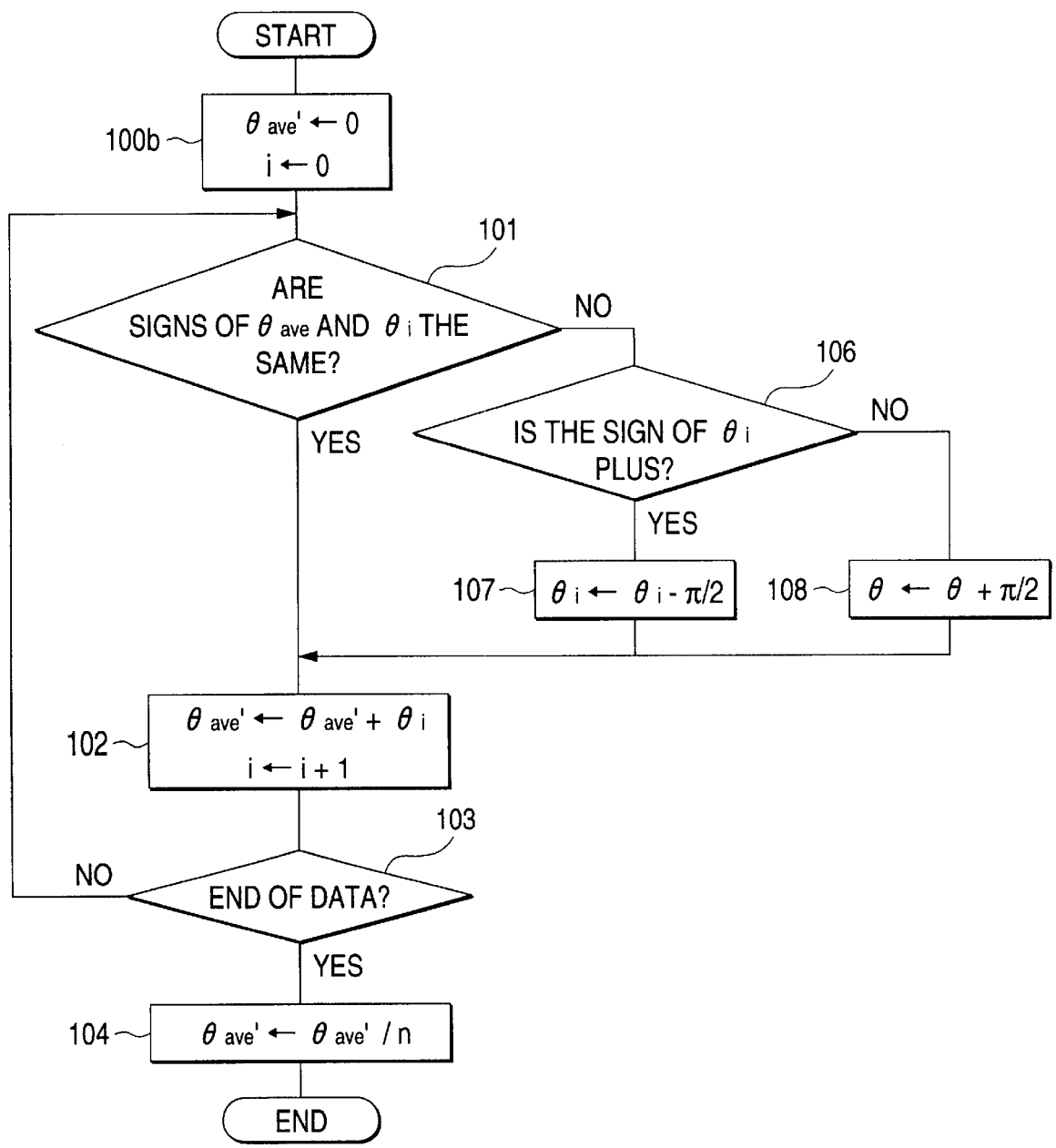
FIG. 5 is a flowchart of processing by a phase error correcting section in accordance with the second embodiment.

FIG. 5 is a flowchart of processing by the phase error correcting section 23b, in which eave denotes the average value of phase errors, $\theta ave'$ denotes a correction value for the average value of phase errors, and $\theta i$ denotes the phase error of an i-th carrier.

First, initialization is effected in Step 100b, and if the sign of the average value $\theta ave$ of phase errors and the sign of an i-th phase error θi are the same, processing in Step 102 is effected, and if not, a determination is made in Step 106 as to whether or not the sign of the i-th phase error θi is plus. If plus, it is considered that the data of the quadrant which advanced by π/2 has changed, so that in Step 107 the phase error is corrected by using the phase which advanced by π/2 as a reference. If minus, it is considered that the data of the quadrant which lagged by π/2 has changed, so that in Step 108 the phase error is corrected by using the phase which lagged by π/2 as a reference. Subsequently, in Step 102, the sum of averages of phase errors is calculated, and the carrier number i is incremented by 1. In Step 103, if i is greater than the number of pieces of data, a determination is made that it is the end of data, and the average value is calculated in Step 104 and is outputted to the frequency tuning control means 13.

Through this processing, it is possible to detect a phase error which is substantially proportional to the frequency deviation even up to a large frequency deviation, and the frequency tuning control means 13 changes the frequency of the local oscillator 4 by a frequency portion proportional to this phase error.

It should be noted that, in the phase error detection, the data in an N-th quadrant may be approximated by imaginary parts or real parts after imparting rotation by a −(2N−1)π/4 radian thereto.

Third Embodiment

Figure 6:
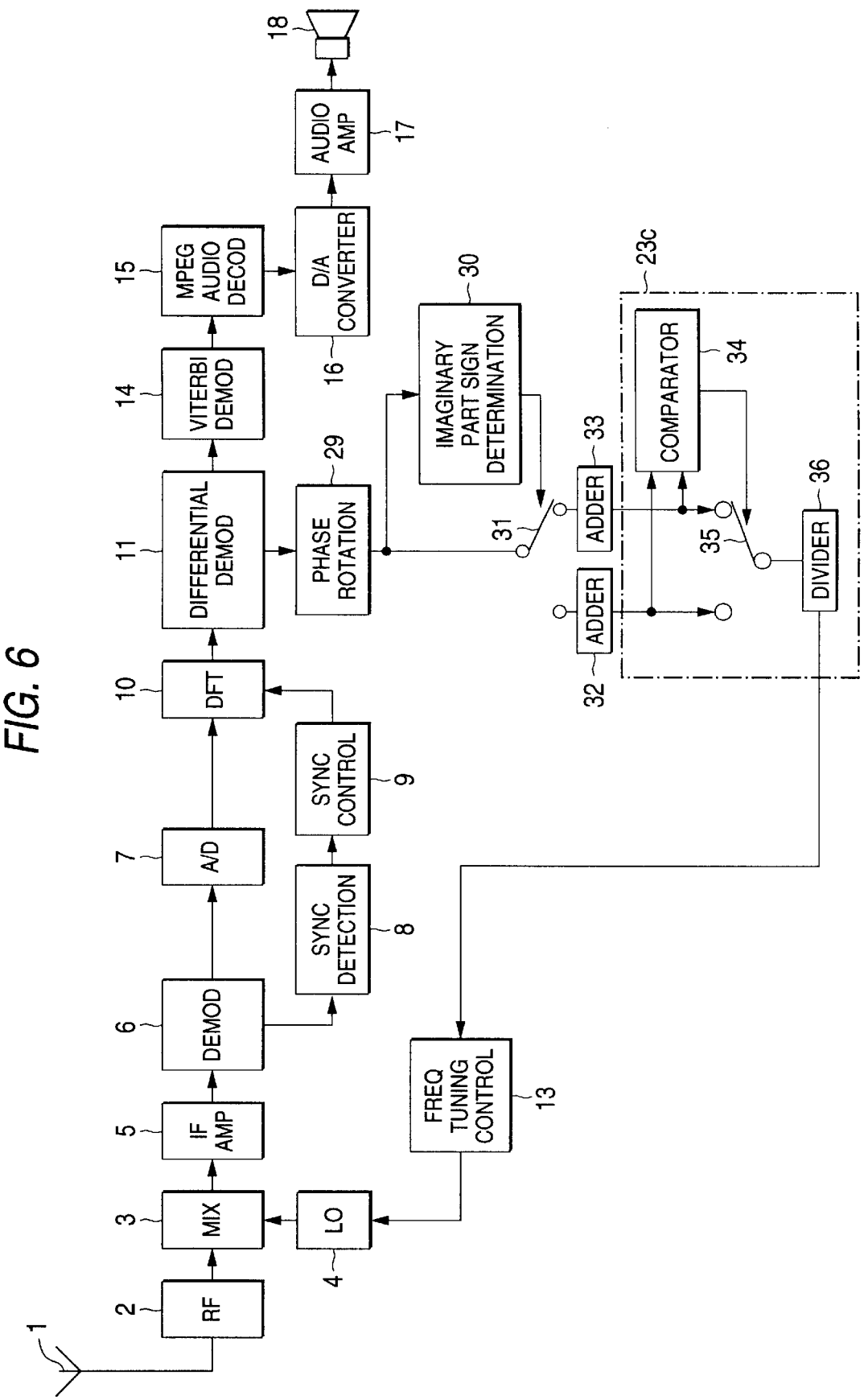
FIG. 6 is a block diagram illustrating the configuration of the digital audio broadcasting receiver in accordance with a third embodiment of the present invention.

FIG. 6 is a schematic block diagram illustrating a third embodiment of the present invention, and the same reference numerals as those of FIG. 1 denote identical or corresponding portions, respectively. In the drawing, reference numeral 23c denotes a phase error correcting section which is comprised of a comparator 34, a switch 35, and a divider 36.

Reference numeral 29 denotes a phase rotating unit for detecting a phase error from (2N−1)π/4 in the data in the N-th quadrant of each carrier outputted from the differential demodulator 11. Numeral 30 denotes an imaginary-part sign determining unit for determining the sign of imaginary parts of phase error in the output from the phase rotating unit 29. Numeral 31 denotes a switch for changing over the output from the phase rotating unit 29 on the basis of the result of determination by the imaginary-part sign determining unit 30. Numerals 32 and 33 denote adders connected to the switch 31.

Since the operation of the antenna 1 to the speaker 18 is identical to that of the first embodiment, a description thereof will be omitted.

The signal demodulated by the DFT means 10 is subjected to differential demodulation by the differential demodulator 11. Here, if the oscillation frequency of the local oscillator 4 has deviated, a phase rotation of a predetermined level or more occurs during the period of one symbol. For this reason, the phase of the differentially demodulated data deviates from (2N−1)π/4. The phase rotating unit 29 rotates the output of the differentially demodulated data by a −(2N−1)π/4 radian. A phase deviation from a positive real axis after this operation becomes the phase error.

Figure 7:
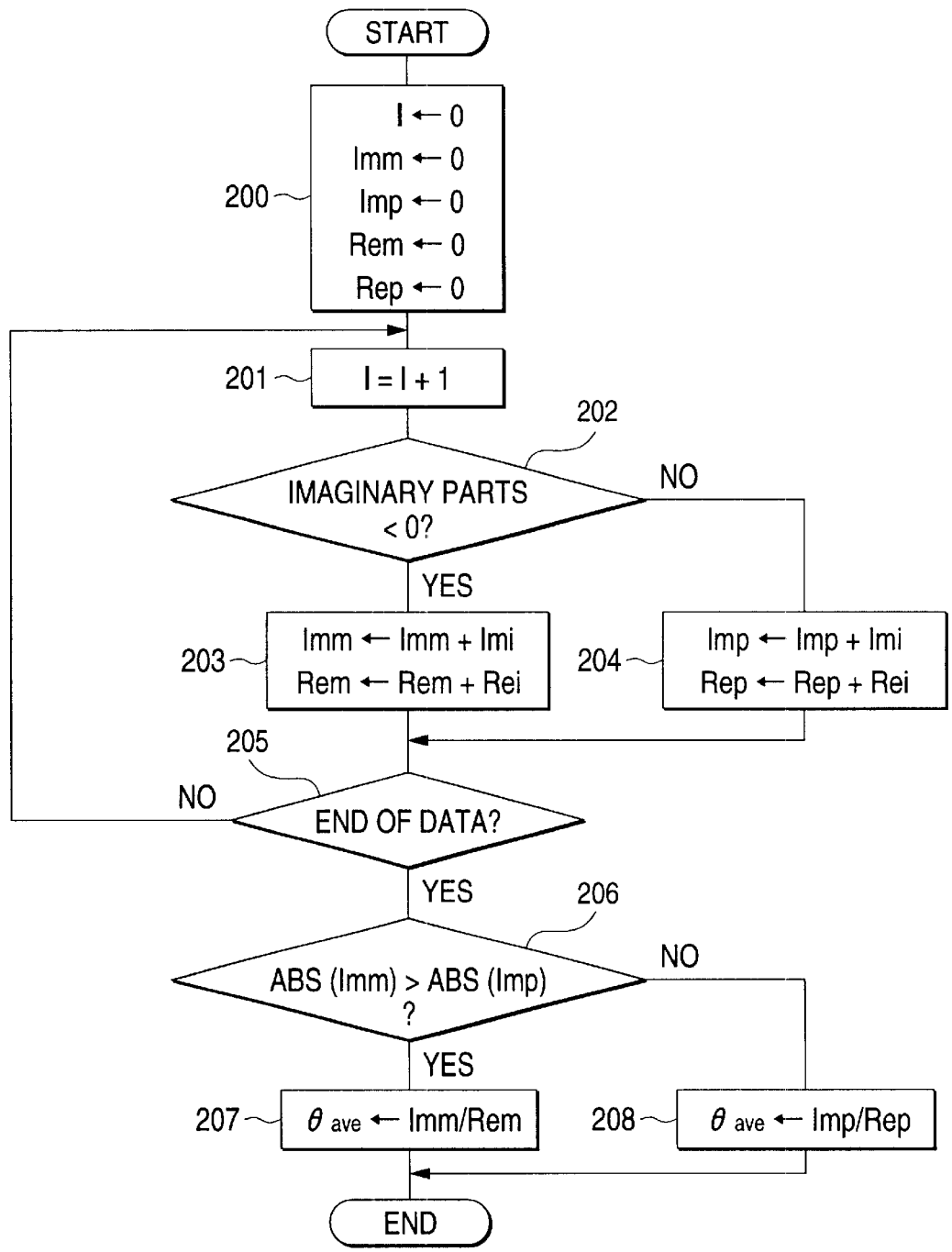
FIG. 7 is a flowchart of processing by a phase error correcting section in accordance with the third embodiment.

Hereafter, a description will be given of the operation with reference to the flowchart shown in FIG. 7. First, initialization is effected in Step 200, and a carrier is set in Step 201. Next, in Step 202, the imaginary-part sign determining unit 30 determines the sign of the imaginary parts of the output data from the phase rotating unit 29, and changes over the switch 35, and if the sign of the imaginary parts of the output data is plus, the output of the imaginary-part sign determining unit 30 is connected to the adder 32, and calculations of Step 204 are performed. Meanwhile, if the sign of the imaginary parts of the output data is minus, the output of the imaginary-part sign determining unit 30 is connected to the adder 33, and calculations of Step 203 are performed.

Next, if it is determined in Step 205 that it is the end of data, in Step 206 the comparator 34 of the phase error correcting section 23c compares the magnitude of the sum of imaginary parts between the outputs from the adder 32 and the adder 33. If the absolute value of the sum of minus imaginary parts is greater than the absolute value of the sum of plus imaginary parts, the switch 35 is connected to the adder 33, and the calculation of imaginary parts/real parts (Imm/Rem) is performed by the divider 36 in Step 207. Meanwhile, if the sum of minus imaginary parts is not greater than the sum of plus imaginary parts, the switch 35 is connected to the adder 32, and the calculation of imaginary parts/real parts (Imp/Rep) is performed by the divider 36 in Step 208, and the result is outputted to the frequency tuning control means 13 as the phase error. As a result, it is possible to control the local oscillator 4 without being affected by the differentially demodulated data which changed to the data in adjacent quadrants due to leakage from other carriers.

Fourth Embodiment

Figure 8:
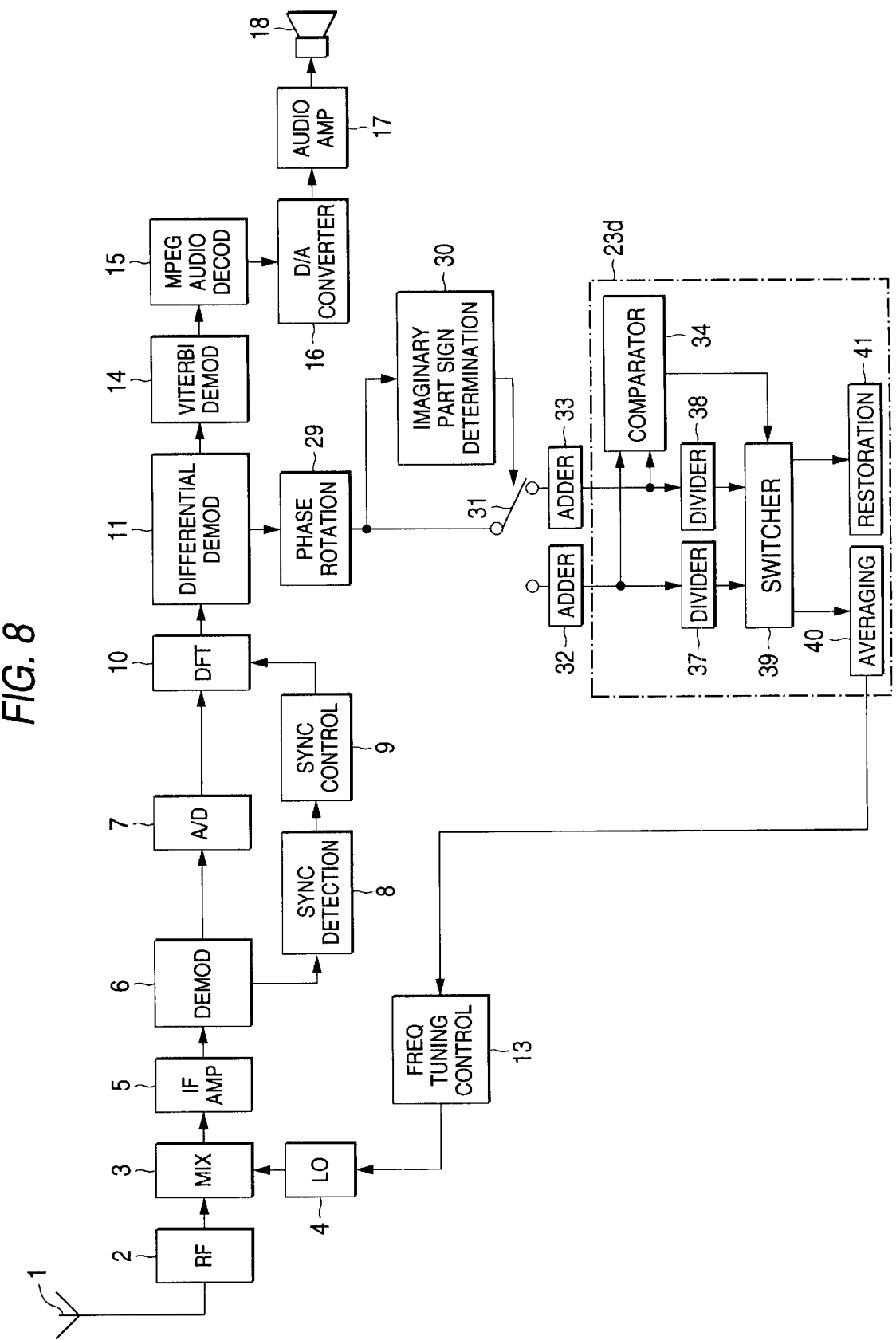
FIG. 8 is a block diagram illustrating the configuration of the digital audio broadcasting receiver in accordance with a fourth embodiment of the present invention.

FIG. 8 is a schematic block diagram illustrating a fourth embodiment of the present invention, and the same reference numerals as those of FIG. 6 denote identical or corresponding portions, respectively. In the drawing, reference numeral 23d denotes a phase error correcting section which is comprised of the comparator 34, dividers 37 and 38, a switcher 39, an averaging unit 40, and a restoring unit 41.

Since the operation of the antenna 1 to the speaker 18 is identical to that of the first embodiment, a description thereof will be omitted.

The adder 32 adds complex data in a case where the sign of imaginary parts is plus, while the adder 33 adds complex data in a case where the sign of imaginary parts is minus. The divider 37 calculates imaginary parts/real parts for the adder 32, while the divider 38 calculates imaginary parts/real parts for the adder 33. The switcher 29 inputs to the averaging unit 40 the output from the divider whose absolute value of the sum of imaginary parts is greater, and inputs to the restoring unit 41 the output from the divider whose absolute value of the sum of imaginary parts is smaller. The outputs subjected to phase correction in the restoring unit 41 are then inputted to the averaging unit 40.

Figure 9:
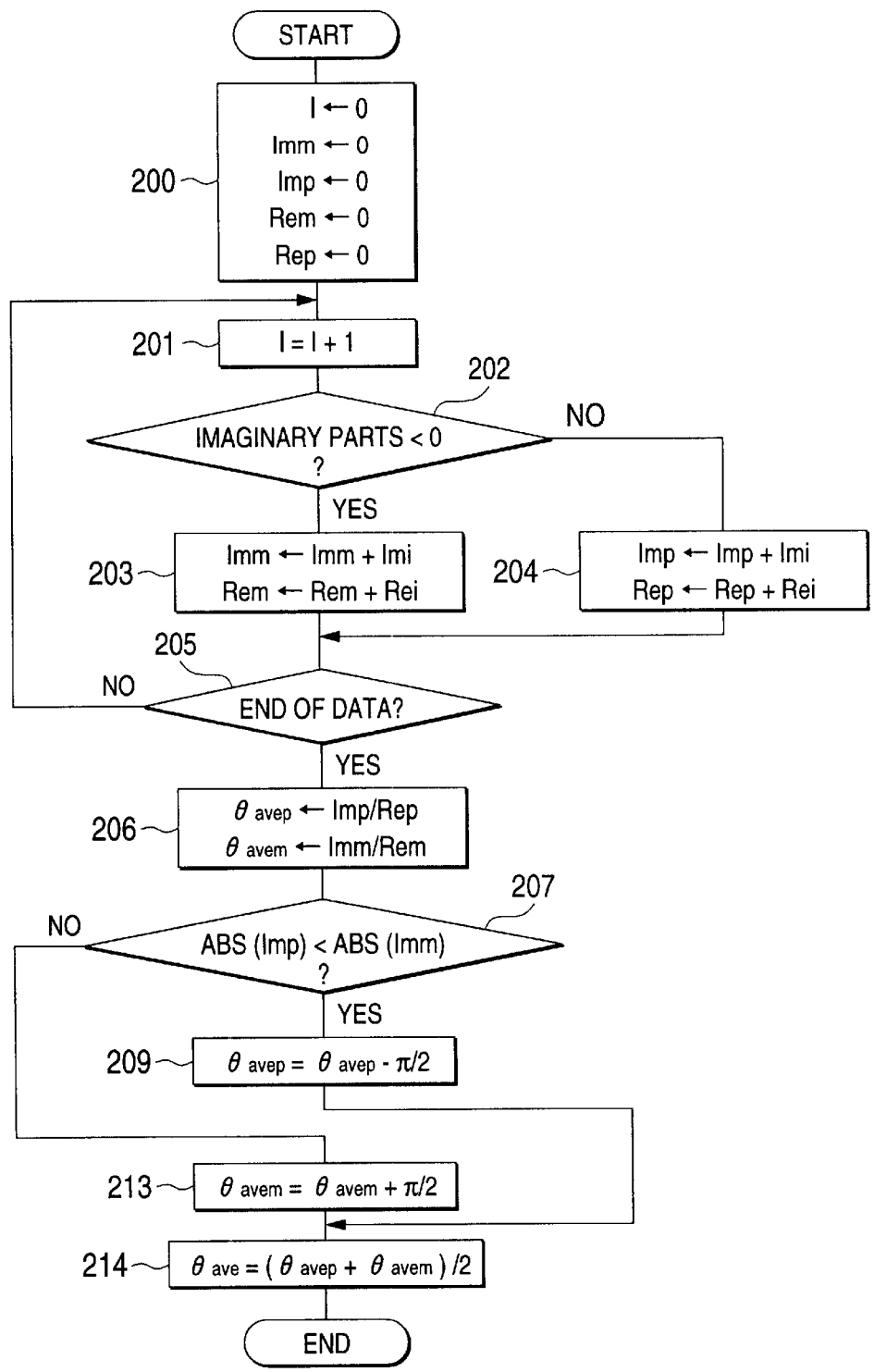
FIG. 9 is a flowchart of processing by a phase error correcting section in accordance with the fourth embodiment.

FIG. 9 shows a flowchart. Since the processing from Step 200 to Step 205 shown in FIG. 9 is similar to that of the flowchart shown in FIG. 7 in accordance with the third embodiment, a description thereof will be omitted. In Step 206, if imaginary parts are plus, the divider 37 calculates imaginary parts/real parts (Imp/Rep), and if the imaginary parts are minus, the divider 38 calculates imaginary parts/real parts (Imm/Rem). Next, in Step 207 the comparator 34 compares the absolute values of the sums of imaginary parts of the adders 32 and 33. If the absolute value of the sum of minus imaginary parts of the adder 33 is greater than that of the adder 32, θavep calculated on the basis of the imaginary parts of the adder 32 is erroneous, so that θavep is restored by processing in Step 209. Meanwhile, if the absolute value of plus imaginary parts (imaginary parts of the adder 32) is greater than the absolute value of imaginary parts of the adder 33 in Step 207, θavem is corrected by effecting processing in Step 213. In Step 214, the averaging unit 40 performs averaging processing with respect to the phase error which was not determined to be in error and the restored phase error. The result is outputted to the frequency tuning control means 13 as the phase error.

As a result, it is possible to control the local oscillator 4 without being affected by the differentially demodulated data which changed to the data in adjacent quadrants due to leakage from other carriers.

Fifth Embodiment

Figure 10:
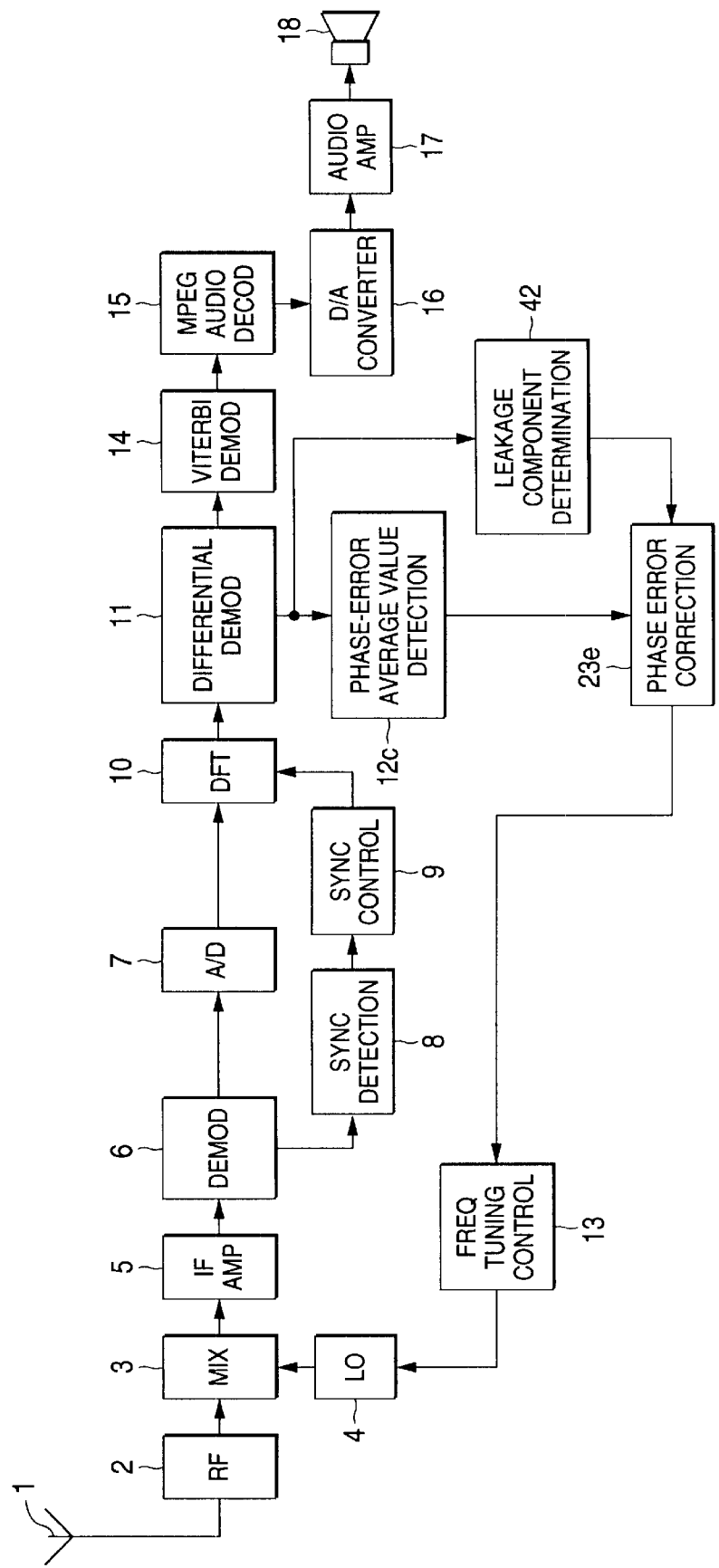
FIG. 10 is a block diagram illustrating the configuration of the digital audio broadcasting receiver in accordance with a fifth embodiment of the present invention.

FIG. 10 is a schematic block diagram illustrating a fifth embodiment of the present invention, and the same reference numerals as those of FIG. 1 denote identical or corresponding portions, respectively. In the drawing, reference numeral 12c denotes a phase-error average value detector for detecting the average value of phase errors from $(2N-1)\pi/4$ of the carriers outputted from the differential demodulator 11; 42, a leakage component determining unit which is connected to the differential demodulator 11 and estimates the magnitude of leakage from other carriers; and 23e, a phase error correcting section which is connected to the leakage component determining unit 42 and corrects the average value of phase errors when the leak components are large.

Since the operation of the antenna 1 to the speaker 18 is identical to that of the first embodiment, a description thereof will be omitted.

The signal demodulated by the DFT means 10 is subjected to differential demodulation by the differential demodulator 11. Here, if the oscillation frequency of the local oscillator 4 has deviated, a phase rotation of a predetermined level or more occurs during the period of one symbol. For this reason, the phase of the differentially demodulated data deviates from $(2N-1)\pi/4$. The phase-error average value detector 12c outputs the average value of phase errors of the carriers.

Figure 11:
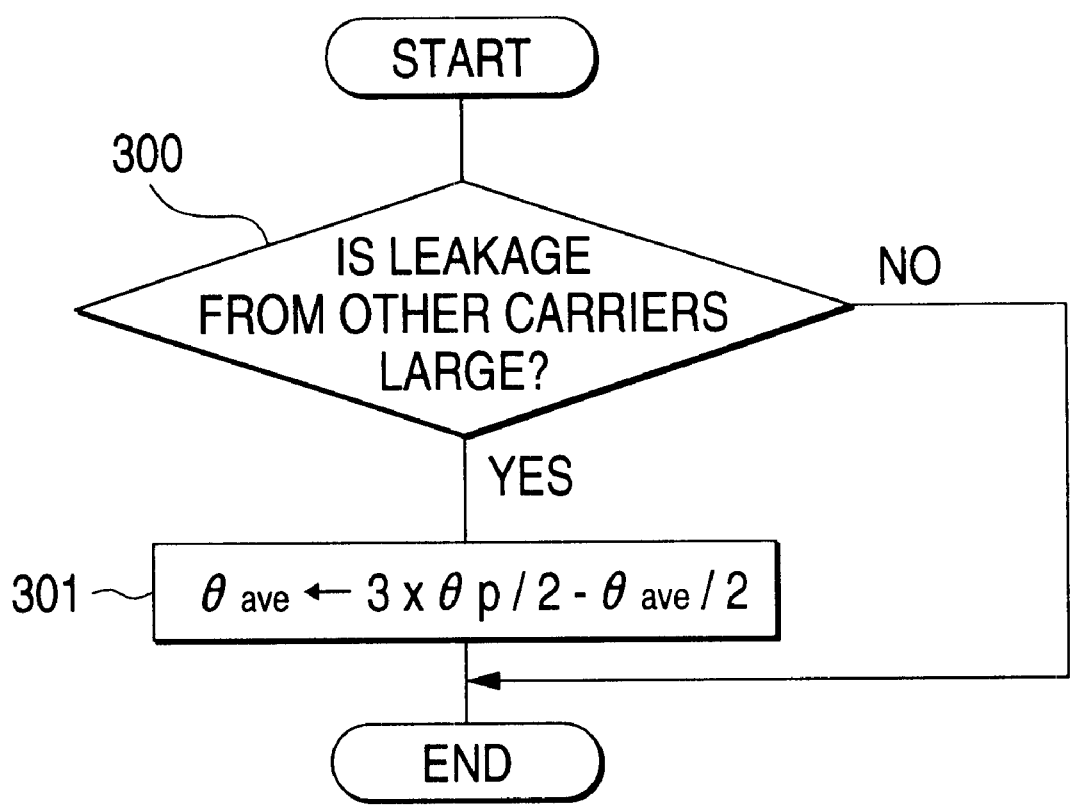
FIG. 11 is a flowchart of processing by a leakage component determining unit and a phase error correcting section in accordance with the fifth embodiment.

Hereafter, a description will be given with reference to the flowchart shown in FIG. 11.

If the leakage component determining unit 42 determines in Step 300 that the leakage components from other carriers are large, the phase error correcting section 23e effects correction of phase error in Step 301.

Hereafter, a description will be given of the processing in Step 301. θp is a value of about 30 degrees or thereabouts and is a maximum value of phase error when there is an effect of carrier leakage. Here, the inclination of the phase errors when the effect of carrier leakage is large is about two times the inclination when it is small. By taking into consideration the fact that the phase error is proportional to this inclination and the frequency deviation, when the leakage from other carriers is large, correction is made so that the phase error approaches Formula (3) by using the following Formula (4):

$$\theta' = 3 \cdot \theta p/2 - \theta/2 \qquad (4)$$

where, θp: theoretically maximum value of the average value of phase errors

θ: output of the averaging processing means

θ: corrected phase error

By using this phase error, it is possible to control the local oscillator 4 without being affected by the differentially demodulated data which changed to the data in adjacent quadrants due to leakage from other carriers.

In addition, the operation in which the phase error increases may be added without complying with Formula (4).

For example, the coefficient of Formula (4) may be changed or replaced by a relatively large fixed value (e.g., 30 degrees which is a maximum value for a carrier in a case where there is leakage from other carriers).

Sixth Embodiment

Figure 12:
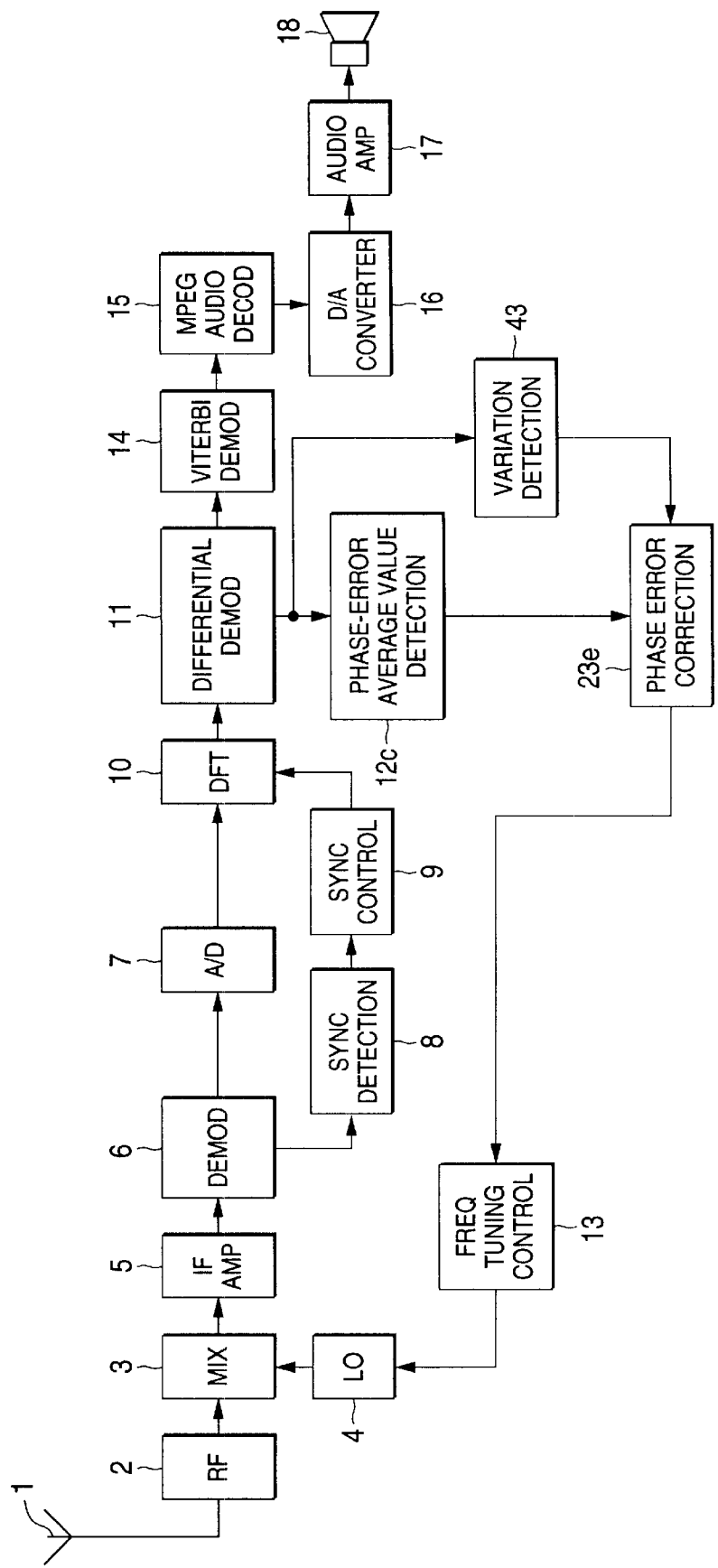
FIG. 12 is a block diagram illustrating the configuration of the digital audio broadcasting receiver in accordance with a sixth embodiment of the present invention.

FIG. 12 is a schematic block diagram illustrating a sixth embodiment of the present invention, and the same reference numerals as those of FIG. 10 denote identical or corresponding portions, respectively. In the drawing, reference numeral 43 denotes a variation detecting unit which is connected to the differential demodulator 11 and calculates the variation of the data; 23e, a phase error correction unit which is connected to the leakage component determining unit and corrects the average value of phase errors when leakage components are large.

Since the operation of the antenna 1 to the speaker 18 is identical to that of the first embodiment, a description thereof will be omitted.

The signal demodulated by the DFT means 10 is subjected to differential demodulation by the differential demodulator 11. Here, if the oscillation frequency of the local oscillator 4 has deviated, a phase rotation of a predetermined level or more occurs during the period of one symbol. For this reason, the phase of the differentially demodulated data deviates from $(2N-1)\pi/4$. The phase-error average value detector 12c outputs the average value of phase errors of the carriers.

In addition, if leakage from other carriers is large, the differentially demodulated data also varies. Accordingly, the variation s of the differentially demodulated signal is calculated in accordance with the following formula:

$$\sigma = \Sigma\{(Rei - Reave)^2 + (Imi - Imave)^2\} \qquad (5)$$

where,

Rei: real parts of i-th differential data

Reave: average value of real parts

Imi: imaginary parts of i-th differential data

Imave: average value of imaginary parts

Figure 13:
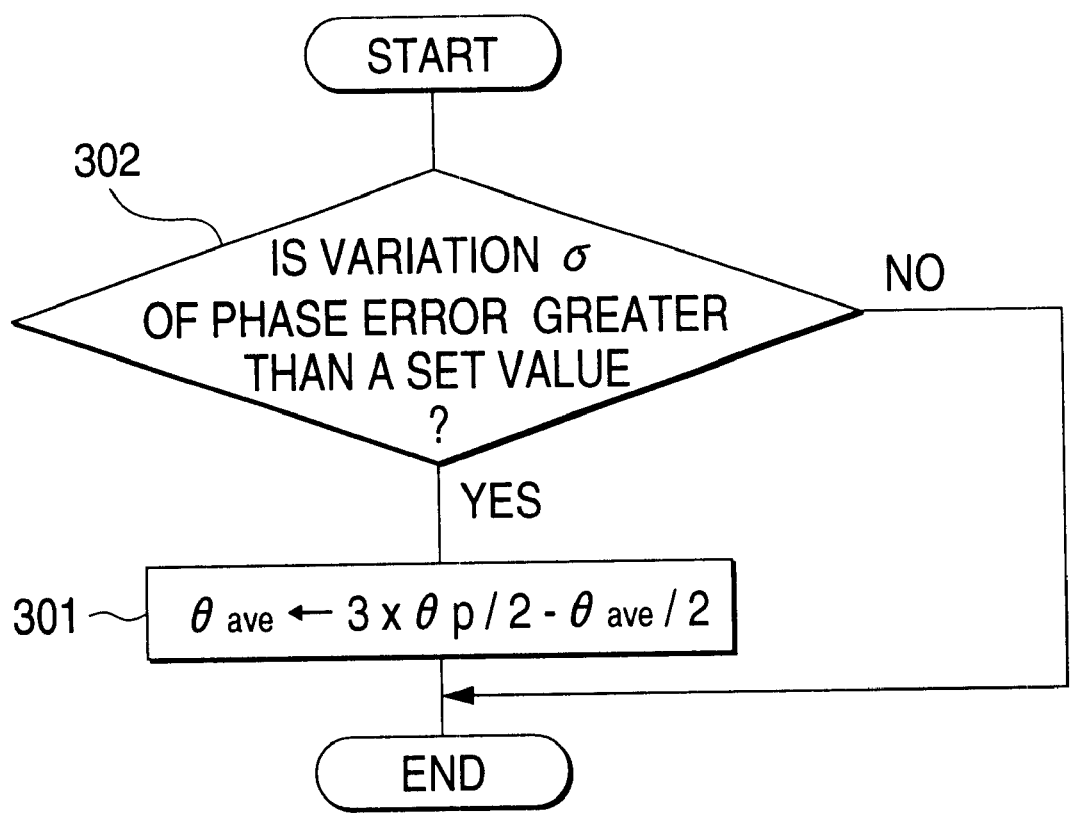
FIG. 13 is a flowchart of processing by a leakage component determining unit and a phase error correcting section in accordance with the sixth embodiment.

Next, a description will be given of the operation of correction of the phase error with reference to the flowchart shown in FIG. 13. In Step 302, a determination is made as to whether or not the variation a is greater than a set value. If it is smaller, a determination is made that the leakage of components from other carriers is small, and the correction of phase error is not performed.

Meanwhile, if the variation a is greater than the set value, correction is made in Step 301. The processing in Step 301 is similar to that in the fifth embodiment.

By using this phase error, it is possible to control the local oscillator 4 without being affected by the differentially demodulated data which changed to the data in adjacent quadrants due to leakage from other carriers.

In addition, the operation in which the phase error increases may be added without complying with Formula (4).

For example, the coefficient of Formula (4) may be changed or replaced by a relatively large fixed value (e.g., 30 degrees which is a maximum value for a carrier in a case where there is leakage from other carriers).

Seventh Embodiment

Figure 14:
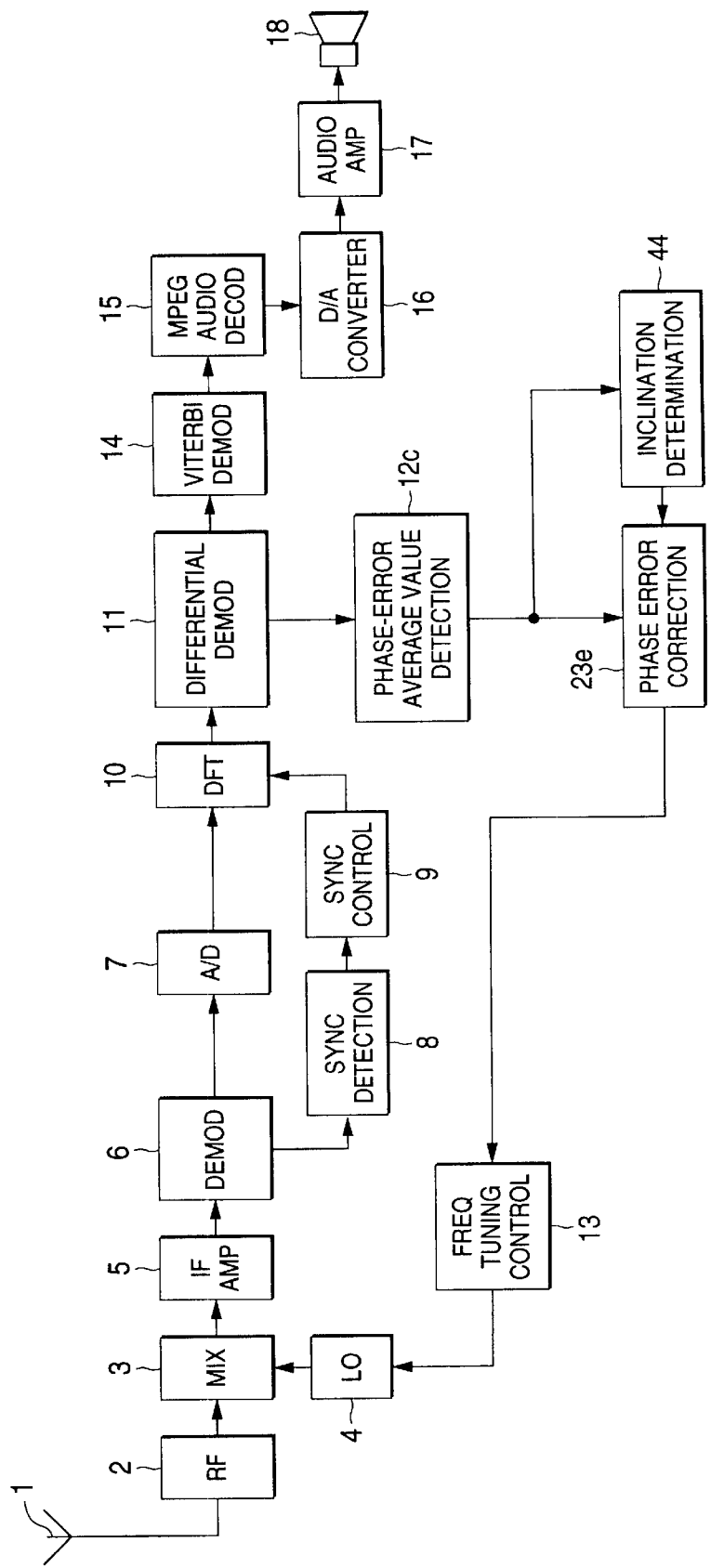
FIG. 14 is a block diagram illustrating the configuration of the digital audio broadcasting receiver in accordance with a seventh embodiment of the present invention.
Figure 15:
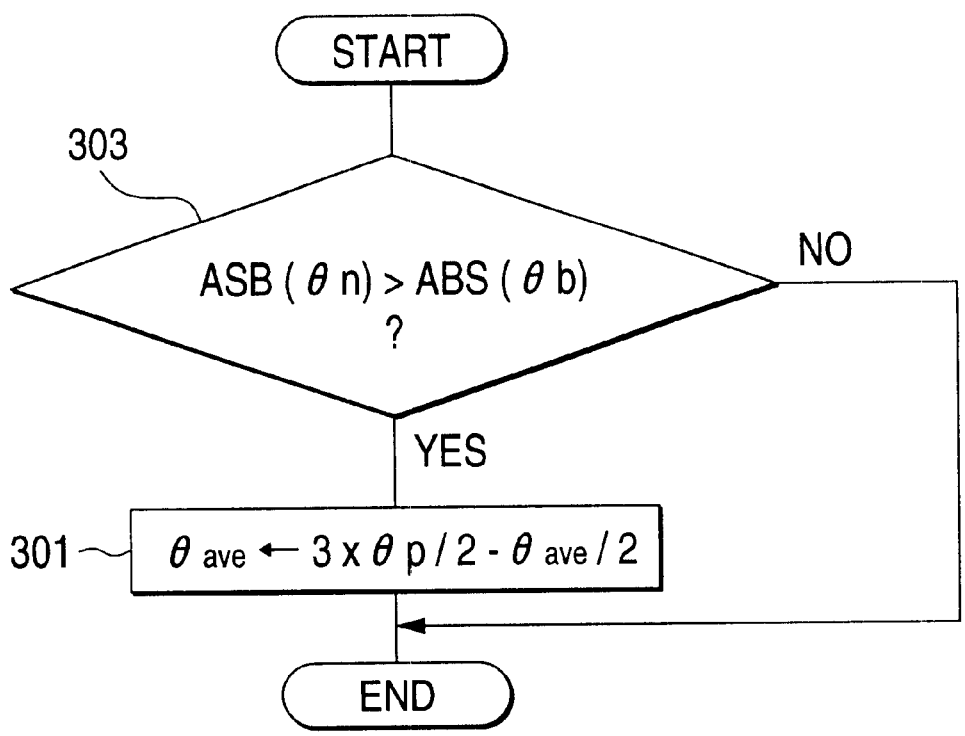
FIG. 15 is a flowchart of processing by an inclination determining unit and a phase error correcting section in accordance with the seventh embodiment.
Figure 16:
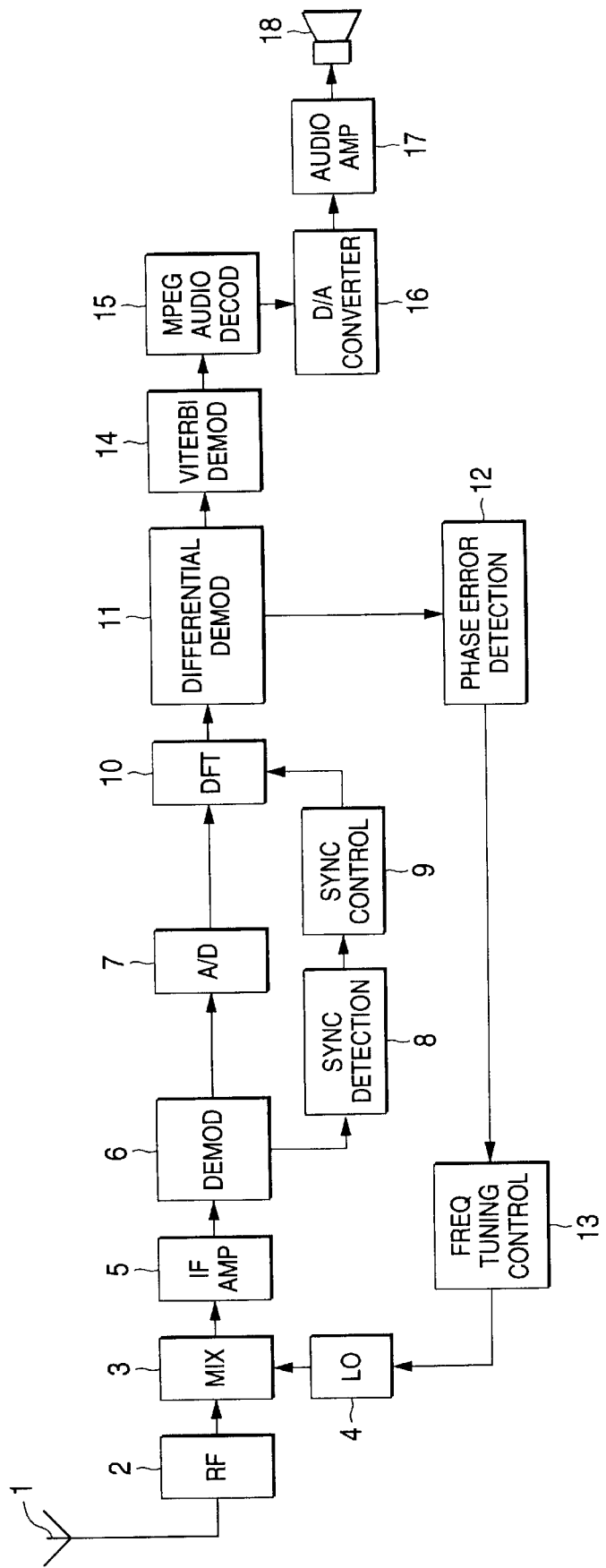
FIG. 16 is a block diagram illustrating a conventional digital audio broadcasting receiver.
Figure 17:
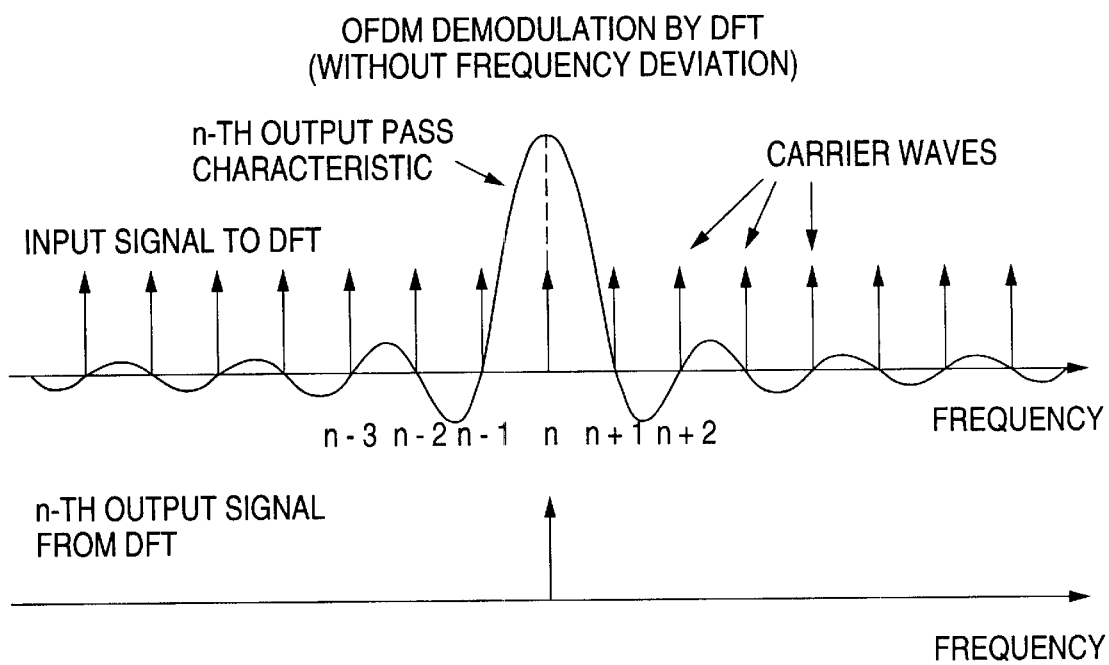
FIG. 17 is a conceptual diagram of DFT in a case where there is no frequency deviation.
Figure 18:
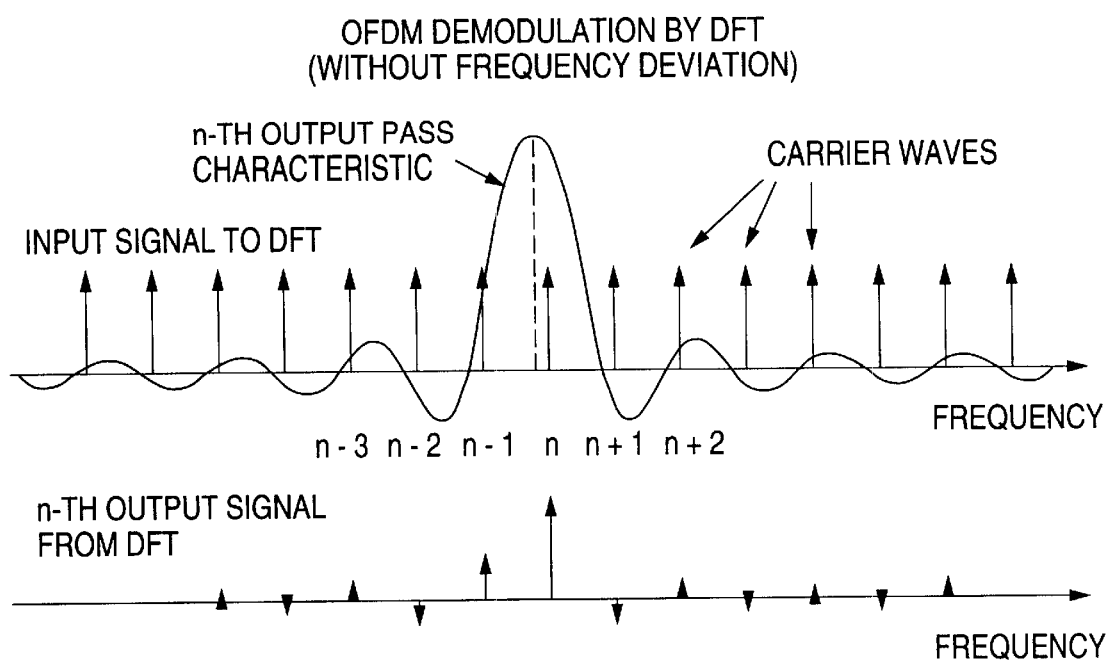
FIG. 18 is a conceptual diagram of DFT in a case where there is a frequency deviation.
Figure 19:
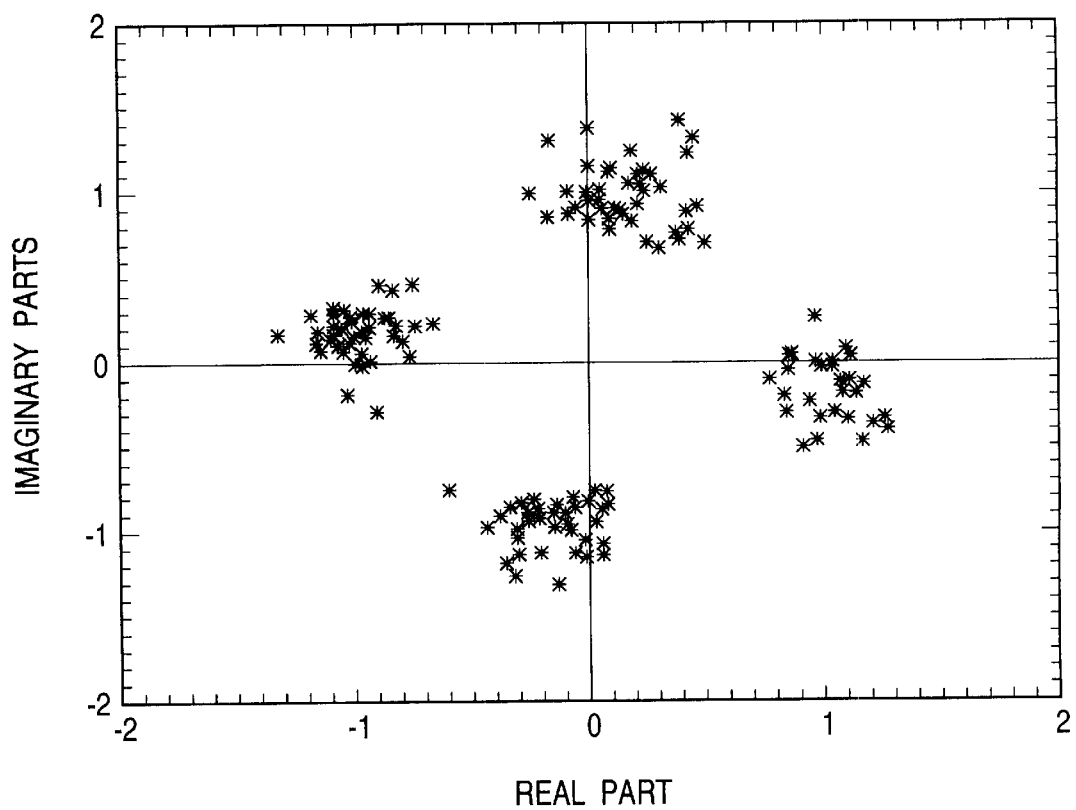
FIG. 19 is a diagram illustrating calculated values of differentially demodulated data owing to leakage from other carriers due to a frequency deviation.

FIG. 14 is a schematic block diagram illustrating a seventh embodiment of the present invention, and the same reference numerals as those of FIG. 10 denote identical or corresponding portions, respectively. In the drawing, reference numeral 44 denotes an inclination determining unit which is connected to the phase-error average value detector 12c and monitors a change with time in the absolute value of the inclination of phase errors, and numeral 23e denotes a phase error correcting section which is connected to the phase-error average value detector 12c and the inclination determining unit 44.

Since the operation of the antenna 1 to the speaker 18 is identical to that of the first embodiment, a description thereof will be omitted.

The signal demodulated by the DFT means 10 is subjected to differential demodulation by the differential demodulator 11. Here, if the oscillation frequency of the local oscillator 4 has deviated, a phase rotation of a predetermined level or more occurs during the period of one symbol. For this reason, the phase of the differentially demodulated data deviates from $(2N-1)\pi/4$. The phase-error average value detector 12c outputs the average value of phase errors of the carriers.

Next, a description will be given of the operation of the inclination determining unit 44 and the phase error correcting section 23e.

In Step 303, comparison is made between absolute values of the phase error detected this time and the phase error detected previously. Here, since feedback is provided to the local oscillator 4 in such a manner that the phase error approaches 0, the real phase error is smaller in the case of the phase error detected this time.

Figure 20:
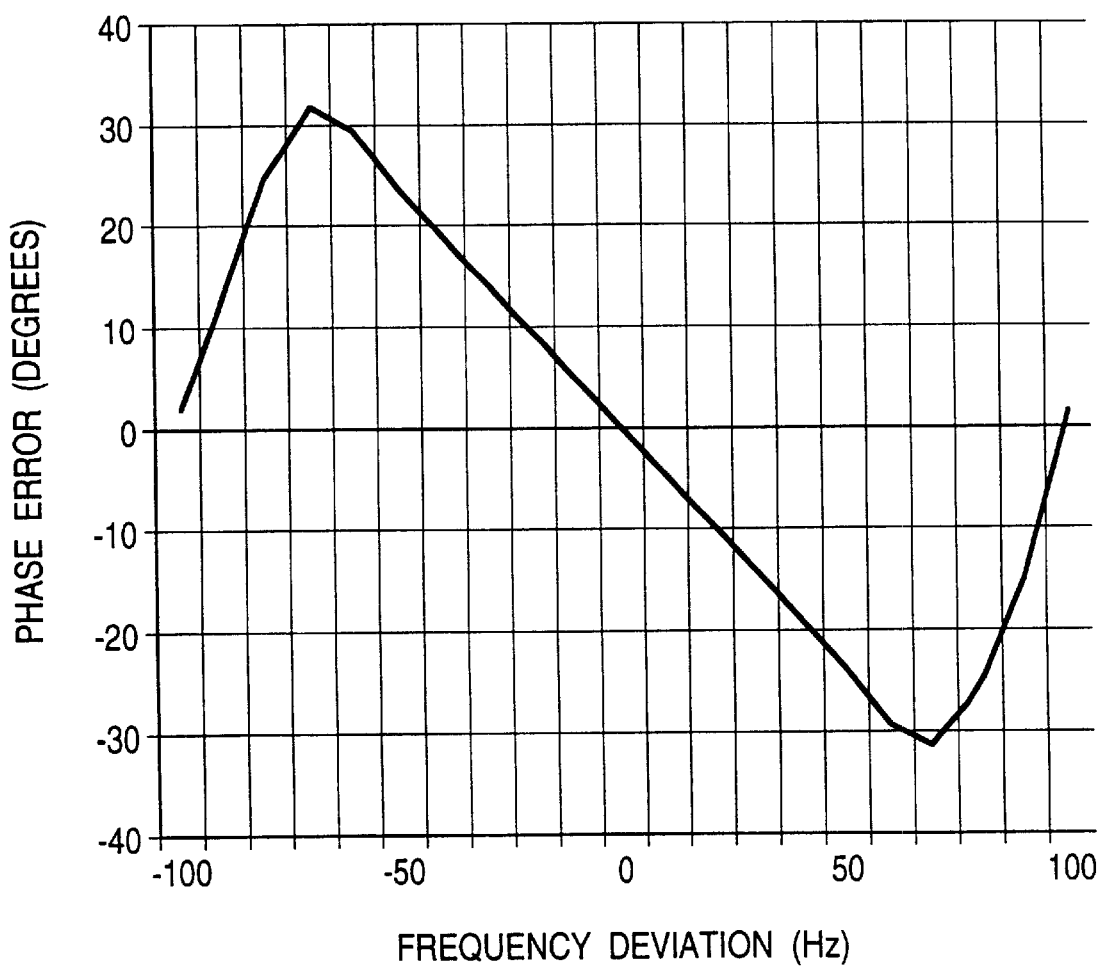
FIG. 20 is a diagram illustrating calculated values of the phase error and the frequency deviation due to leakage from other carriers.

In practice, however, as can be appreciated from FIG. 20, when the frequency deviation becomes large and leakage components from other carriers become large, the detected phase error becomes smaller than the real phase error, whereas the closer to 0 the frequency deviation is, the larger the real phase error becomes than the detected phase error. Accordingly, if the current phase error is greater than the previous one in processing in Step 303, it can be determined that the phase error is located in a region where the leakage components from other carriers are large. Hence, in Step 301, correction of the phase error is effected in accordance with Formula (4) in the same way as in the fifth embodiment.

By using this phase error, it is possible to control the local oscillator 4 without being affected by the differentially demodulated data which changed to the data in adjacent quadrants due to leakage from other carriers.

In addition, the operation in which the phase error increases may be added without complying with Formula (4).

For example, the coefficient of Formula (4) may be changed or replaced by a relatively large fixed value (e.g., 30 degrees which is a maximum value for a carrier in a case where there is leakage from other carriers).

In accordance with the present invention, since the phase error calculated on the basis of the differential demodulation output data which changed to adjacent carriers due to the leakage from other carriers is excluded, the phase error due to the frequency deviation is prevented from becoming small, thereby making it possible to shorten the frequency pulling-in time.

In addition, since the phase error calculated on the basis of the differential demodulation output data which changed to adjacent carriers due to the leakage from other carriers is used after being corrected, the phase error due to the frequency deviation is prevented from becoming small, the average number of points is prevented from being reduced, and the variation of the phase error is prevented from becoming large, thereby making it possible to shorten the frequency pulling-in time.

Further, the phase error is determined after the differential demodulation output data which changed to adjacent carriers due to the leakage from other carriers is excluded. Hence, the phase error due to the frequency deviation is prevented from becoming small, thereby making it possible to shorten the frequency pulling-in time.

Further, the phase error is determined after the differential demodulation output data which changed to adjacent carriers due to the leakage from other carriers is excluded. Hence, the phase error due to the frequency deviation is prevented from becoming small, the number of averaging points is prevented from being reduced, and the variation of the phase error is prevented from becoming large, thereby making it possible to shorten the frequency pulling-in time.

Further, leakage components are determined from the differential demodulation output, and the average value of phase errors already calculated is corrected to a linear value which is substantially proportional to the frequency deviation, thereby making it possible to shorten the frequency pulling-in time.

In addition, the leakage from other carriers is detected in the region where the phase error becomes large with the lapse of time, and the average value of phase errors already calculated is corrected to a linear value which is substantially proportional to the frequency deviation, thereby making it possible to shorten the pulling-in time.

What is claimed is:

1. A digital audio broadcasting receiver comprising:
   a local oscillator corresponding to digital broadcasting of a multicarrier transmission system and used in the frequency shift of a received signal;
   complex Fourier transforming unit for subjecting the signal frequency-shifted by said local oscillator to complex discrete Fourier transformation;
   a differential demodulation unit for detecting a phase difference between two successive symbols on an identical carrier;
   a phase error detecting unit for detecting a phase error of output data from said differential demodulation unit;
   a storage unit for storing the phase error detected by said phase error detection unit;
   an average value processing unit for calculating an average value of phase errors of the carriers;
   a sign determining unit for determining a sign of an output from said average value processing unit;
   a phase error correcting unit for calculating an average value of an output from said sign determining unit and the phase error having the same sign as that of the output from said sign determining unit and stored in said storage unit; and
   a frequency tuning control unit to which an output from said phase error correcting unit is inputted and which controls a frequency of said local oscillator.

2. A digital audio broadcasting receiver according to claim 1, wherein said phase error correcting unit corrects the phase error having a sign different from that of an output from said sign determining unit among the phase errors being stored in said storage unit, and calculates an average value of the output from said sign determining unit and the phase error having the same sign as that of the output from said sign determining unit including the corrected phase error.

3. A digital audio broadcasting receiver comprising:

a local oscillator corresponding to digital broadcasting of a multicarrier transmission system and used in the frequency shift of a received signal;

complex Fourier transforming unit for subjecting the signal frequency-shifted by said local oscillator to complex discrete Fourier transformation;

a differential demodulation unit for detecting a phase difference between two successive symbols on an identical carrier;

a phase rotation unit for imparting a phase rotation of a $-(2N-1)\pi/4$ radian to data outputted from said differential demodulation unit when said output data is in an N-th quadrant;

a sign determining unit for determining a sign of an imaginary part of an output from said phase rotation unit;

a switch which is changed over in accordance with the signal determined by said sign determining unit;

a first adder to which a first output from said switch is inputted;

a second adder to which a second output from said switch is inputted;

a phase error correcting unit to which outputs from said first and said second adders are inputted and which outputs as an average value of phase errors a calculated value of imaginary parts divided by real parts of the output whose absolute value of imaginary parts is greater between the two outputs; and a frequency tuning control unit to which an output from said phase error correcting unit is inputted and which controls a frequency of said local oscillator.

4. A digital audio broadcasting receiver according to claim 3, wherein said phase error correcting unit calculates the value of imaginary parts divided by real parts of the output whose absolute value of imaginary parts is greater between the two outputs, corrects the calculated value of imaginary parts divided by real parts of the output whose absolute value of imaginary parts is smaller between the two outputs, averages a calculated value and a corrected value, and outputs an averaged value.

5. A digital audio broadcasting receiver comprising:

a local oscillator corresponding to digital broadcasting of a multicarrier transmission system and used in the frequency shift of a received signal;

complex Fourier transforming unit for subjecting the signal frequency-shifted by said local oscillator to complex discrete Fourier transformation;

a differential demodulation unit for detecting a phase difference between two successive symbols on an identical carrier;

a phase-error average value detecting unit for detecting an average value of phase errors of the differentially demodulated data;

a leakage component determining unit for detecting leakage of a component from another carrier in output data from said phase-error average value detecting unit;

a phase error correcting unit to which outputs from said leakage component determining unit and said phase-error average value detecting unit are inputted and which corrects the average value of the phase errors if the leakage component is at a preset level or more; and a frequency tuning control unit to which an output from said phase error correcting unit is inputted and which controls a frequency of said local oscillator.

6. A digital audio broadcasting receiver according to claim 5, wherein said leakage component determining unit detects a variation of the differentially demodulated data.

7. A digital audio broadcasting receiver according to claim 5, wherein said leakage component determining unit determines that there is leakage from another carrier if signs of average values of phase errors of the differentially demodulated data at two timings are the same and an inclination of absolute values of the phase errors thereof is positive.

* * * * *